US012591367B2

(12) United States Patent
Shveidel et al.

(10) Patent No.: US 12,591,367 B2
(45) Date of Patent: Mar. 31, 2026

(54) TECHNIQUES FOR LOG ORDERING TO OPTIMIZE WRITE LATENCY IN SYSTEMS ASSIGNING LOGICAL ADDRESS OWNERSHIP

(71) Applicant: Dell Products L.P., Hopkinton, MA (US)

(72) Inventors: Vladimir Shveidel, Pardes-Hana (IL); Dror Zalstein, Givatayim (IL); Nimrod Shani, Raanana (IL)

(73) Assignee: Dell Products L.P., Hopkinton, MA (US)

( * ) Notice: Subject to any disclaimer, the term of this patent is extended or adjusted under 35 U.S.C. 154(b) by 262 days.

(21) Appl. No.: 18/581,944

(22) Filed: Feb. 20, 2024

(65) Prior Publication Data

US 2025/0264993 A1    Aug. 21, 2025

(51) Int. Cl.
*G06F 3/06* (2006.01)
*G06F 12/0811* (2016.01)
*G06F 12/1009* (2016.01)

(52) U.S. Cl.
CPC .......... *G06F 3/0611* (2013.01); *G06F 3/0659* (2013.01); *G06F 3/067* (2013.01); *G06F 12/0811* (2013.01); *G06F 12/1009* (2013.01)

(58) Field of Classification Search
CPC ...... G06F 3/0611; G06F 3/0659; G06F 3/067; G06F 12/0811; G06F 12/1009; G06F 11/1471
See application file for complete search history.

(56) References Cited

U.S. PATENT DOCUMENTS

| | | | |
|---|---|---|---|
| 2009/0287890 A1* | 11/2009 | Bolosky ................ | G06F 3/0656 |
| | | | 711/155 |
| 2022/0357854 A1* | 11/2022 | Narasingarayanapeta .................. | |
| | | | G06F 11/2094 |
| 2024/0256128 A1* | 8/2024 | Shveidel ................ | G06F 3/061 |

OTHER PUBLICATIONS

U.S. Appl. No. 18/160,404, filed Jan. 27, 2023, entitled System and Method for Managing Data Portion Ownership in a Storage Cluster, Vladimir Shveidel, et al.

* cited by examiner

*Primary Examiner* — Hosain T Alam
*Assistant Examiner* — Alan Ottot
(74) *Attorney, Agent, or Firm* — BainwoodHuang

(57) ABSTRACT

In at least one embodiment, processing can include receiving a command at a first node in a system, wherein the first node manages first user data (UD) log resources and a second node of the system manages second UD log resources. The first and second nodes can generate sequence numbers from corresponding node-local sequences. Each command of a UD log is associated with a generic serial number (GENSN). Responsive to determining the command is a write I/O directed to logical addresses owned by the first node, the first node can perform processing to record the write I/O in the UD log without any internode communication with the second node. The recorded write I/O can be associated with a GENSN including a non-zero value that is a sequence number of the first node's local sequence and a zero value corresponding to the second node.

20 Claims, 18 Drawing Sheets

150

Head
152

Tail 154

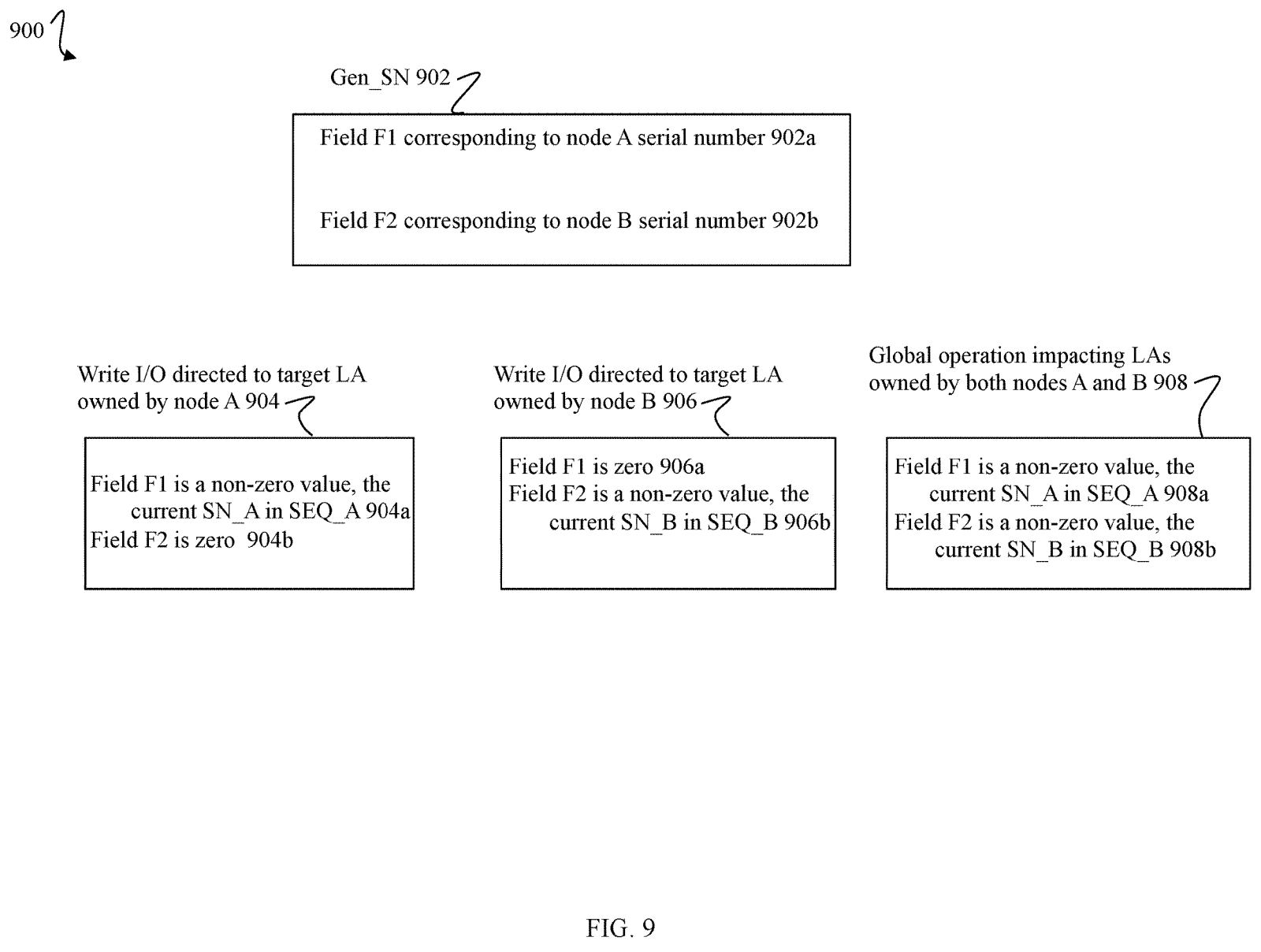

900

Gen_SN 902

Field F1 corresponding to node A serial number 902a

Field F2 corresponding to node B serial number 902b

Write I/O directed to target LA owned by node A 904

Field F1 is a non-zero value, the current SN_A in SEQ_A 904a
Field F2 is zero 904b Write I/O directed to target LA owned by node B 906

Field F1 is zero 906a
Field F2 is a non-zero value, the current SN_B in SEQ_B 906b Global operation impacting LAs owned by both nodes A and B 908

Field F1 is a non-zero value, the current SN_A in SEQ_A 908a
Field F2 is a non-zero value, the current SN_B in SEQ_B 908b

FIG. 9

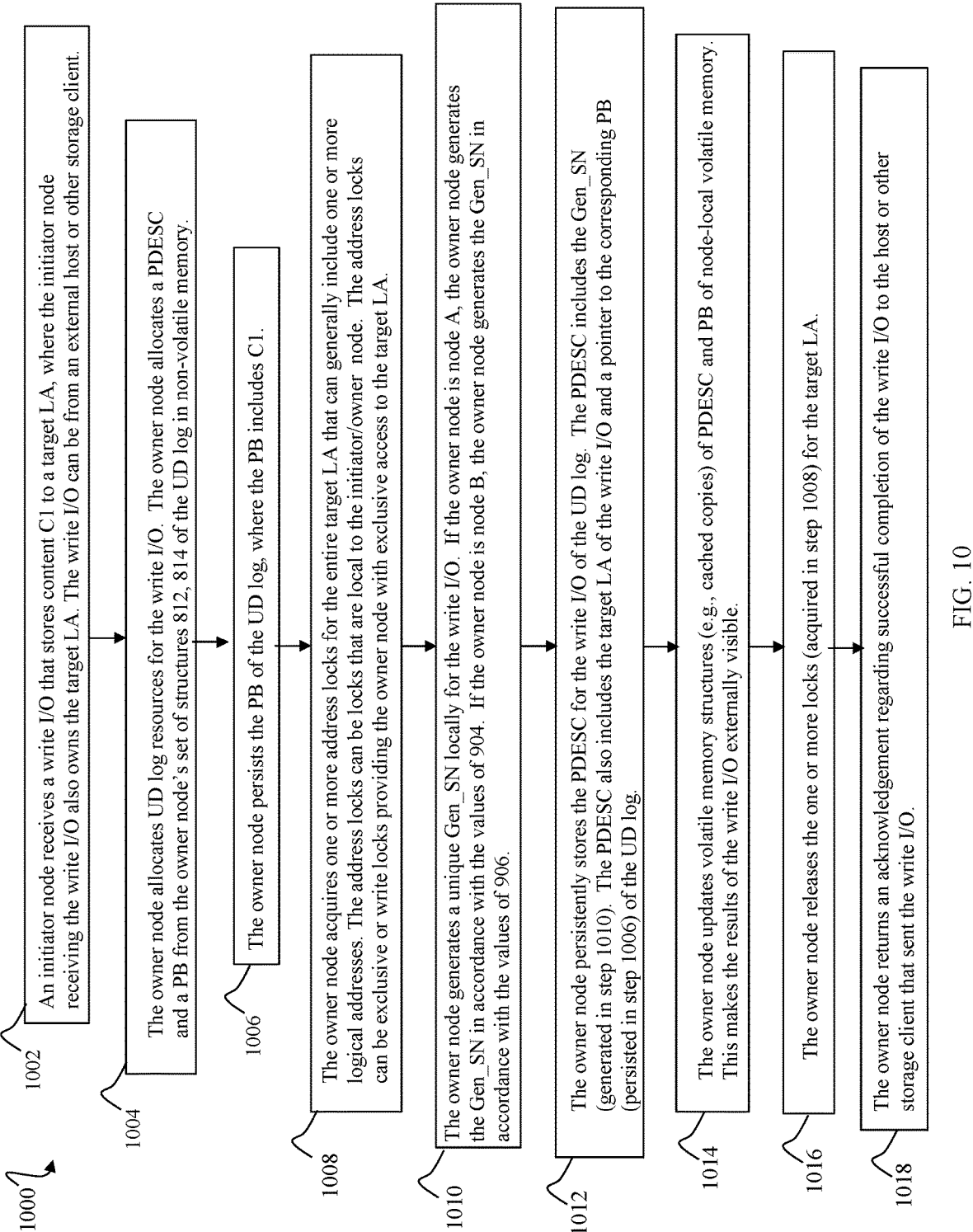

1002 An initiator node receives a write I/O that stores content C1 to a target LA, where the initiator node receiving the write I/O also owns the target LA. The write I/O can be from an external host or other storage client.

1004 The owner node allocates UD log resources for the write I/O. The owner node allocates a PDESC and a PB from the owner node's set of structures 812, 814 of the UD log in non-volatile memory.

1006 The owner node persists the PB of the UD log, where the PB includes C1.

1008 The owner node acquires one or more address locks for the entire target LA that can generally include one or more logical addresses. The address locks can be locks that are local to the initiator/owner node. The address locks can be exclusive or write locks providing the owner node with exclusive access to the target LA.

1010 The owner node generates a unique Gen_SN locally for the write I/O. If the owner node is node A, the owner node generates the Gen_SN in accordance with the values of 904. If the owner node is node B, the owner node generates the Gen_SN in accordance with the values of 906.

1012 The owner node persistently stores the PDESC for the write I/O of the UD log. The PDESC includes the Gen_SN (generated in step 1010). The PDESC also includes the target LA of the write I/O and a pointer to the corresponding PB (persisted in step 1006) of the UD log.

1014 The owner node updates volatile memory structures (e.g., cached copies) of PDESC and PB of node-local volatile memory. This makes the results of the write I/O externally visible.

1016 The owner node releases the one or more locks (acquired in step 1008) for the target LA.

1018 The owner node returns an acknowledgement regarding successful completion of the write I/O to the host or other storage client that sent the write I/O.

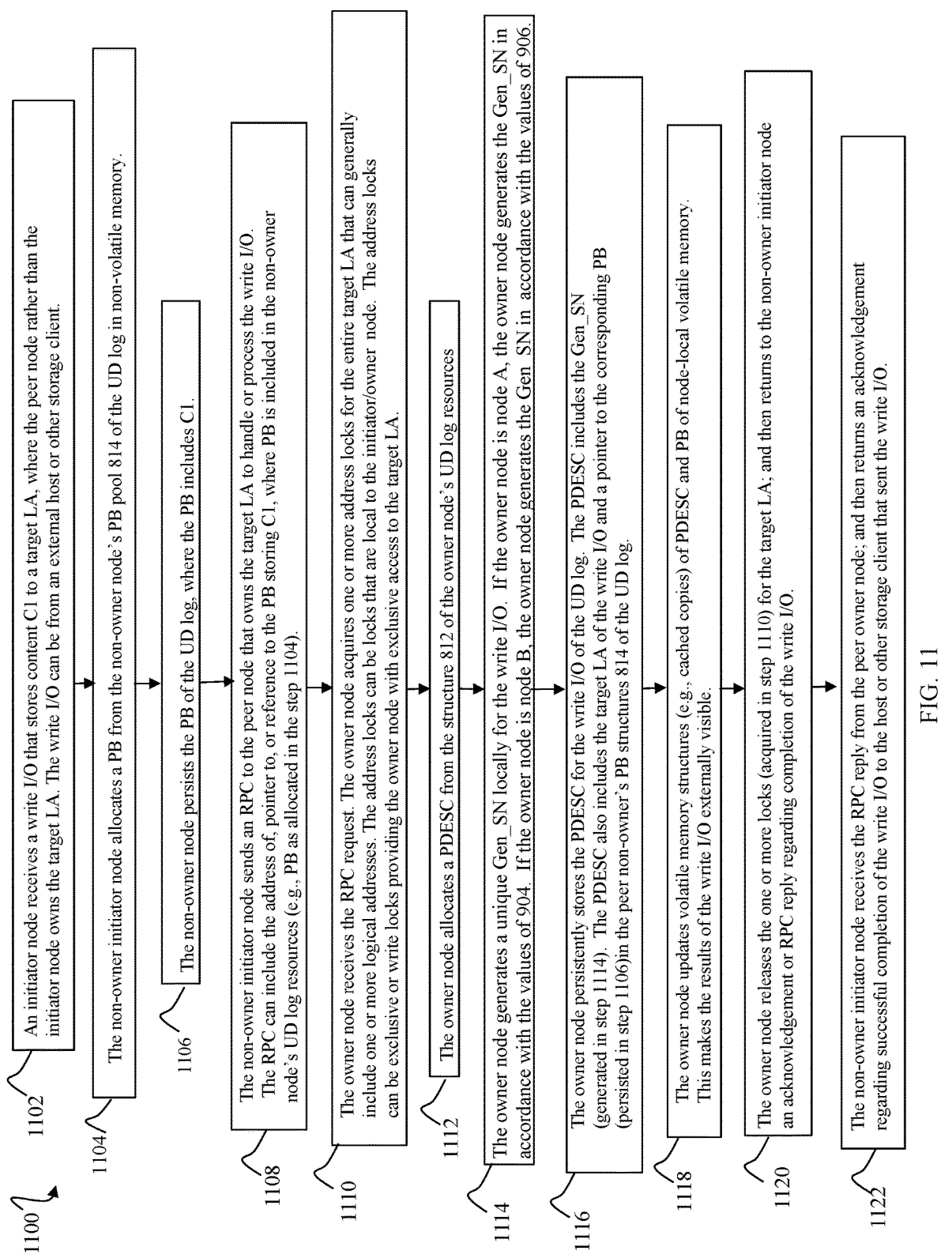

1102 An initiator node receives a write I/O that stores content C1 to a target LA, where the peer node rather than the initiator node owns the target LA. The write I/O can be from an external host or other storage client.

1104 The non-owner initiator node allocates a PB from the non-owner node's PB pool 814 of the UD log in non-volatile memory.

1106 The non-owner node persists the PB of the UD log, where the PB includes C1.

1108 The non-owner initiator node sends an RPC to the peer node that owns the target LA to handle or process the write I/O. The RPC can include the address of, pointer to, or reference to the PB storing C1, where PB is included in the non-owner node's UD log resources (e.g., PB as allocated in the step 1104).

1110 The owner node receives the RPC request. The owner node acquires one or more address locks for the entire target LA that can generally include one or more logical addresses. The address locks can be locks that are local to the initiator/owner node. The address locks can be exclusive or write locks providing the owner node with exclusive access to the target LA.

1112 The owner node allocates a PDESC from the structure 812 of the owner node's UD log resources 1114 The owner node generates a unique Gen_SN locally for the write I/O. If the owner node is node A, the owner node generates the Gen_SN in accordance with the values of 904. If the owner node is node B, the owner node generates the Gen_SN in accordance with the values of 906.

1116 The owner node persistently stores the PDESC for the write I/O of the UD log. The PDESC includes the Gen_SN (generated in step 1114). The PDESC also includes the target LA of the write I/O and a pointer to the corresponding PB (persisted in step 1106)in the peer non-owner's PB structures 814 of the UD log.

1118 The owner node updates volatile memory structures (e.g., cached copies) of PDESC and PB of node-local volatile memory. This makes the results of the write I/O externally visible.

1120 The owner node releases the one or more locks (acquired in step 1110) for the target LA; and then returns to the non-owner initiator node an acknowledgement or RPC reply regarding completion of the write I/O.

1122 The non-owner initiator node receives the RPC reply from the peer owner node; and then returns an acknowledgement regarding successful completion of the write I/O to the host or other storage client that sent the write I/O.

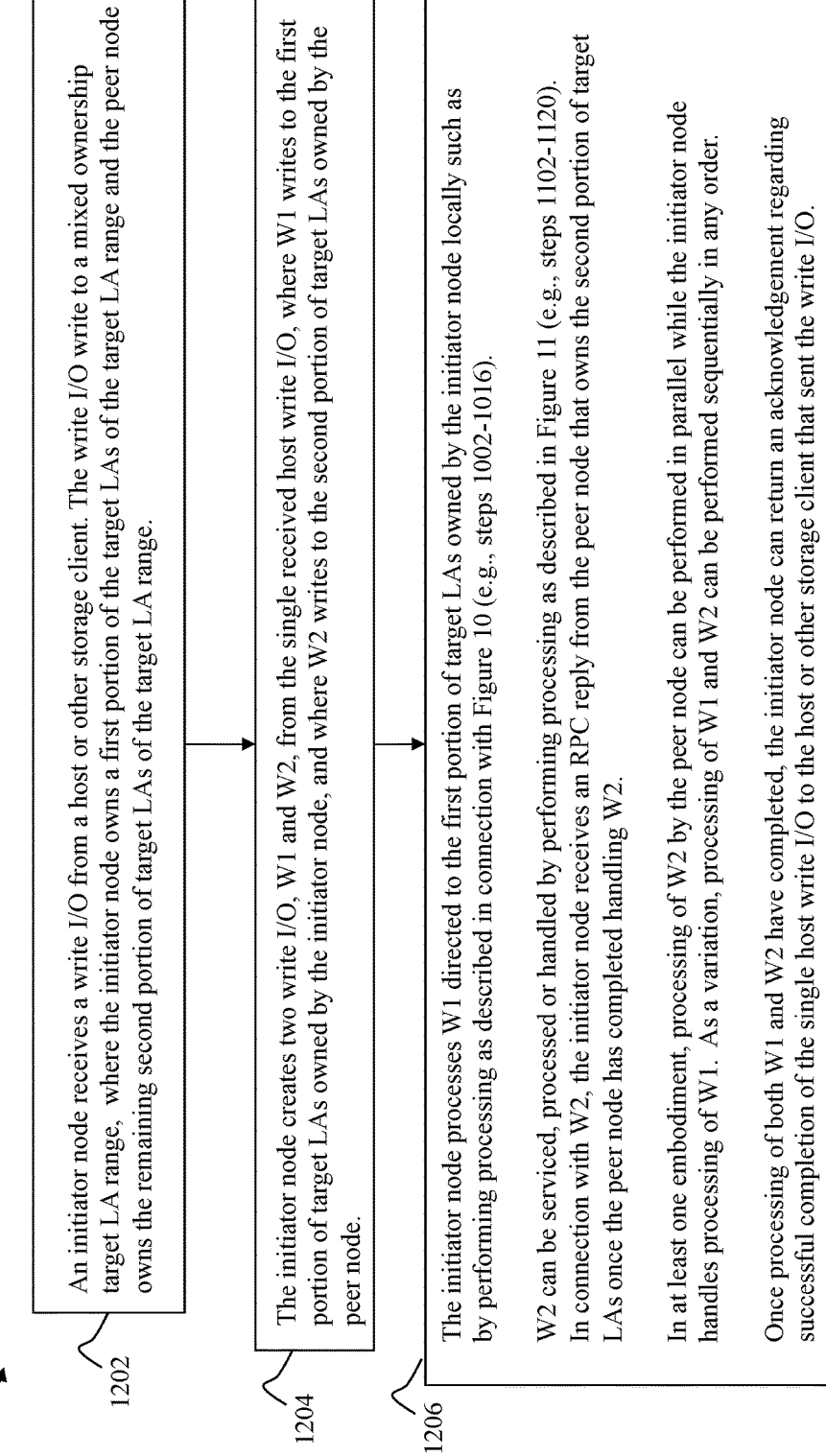

1200

1202 An initiator node receives a write I/O from a host or other storage client. The write I/O write to a mixed ownership target LA range, where the initiator node owns a first portion of the target LAs of the target LA range and the peer node owns the remaining second portion of target LAs of the target LA range.

1204 The initiator node creates two write I/O, W1 and W2, from the single received host write I/O, where W1 writes to the first portion of target LAs owned by the initiator node, and where W2 writes to the second portion of target LAs owned by the peer node.

1206 The initiator node processes W1 directed to the first portion of target LAs owned by the initiator node locally such as by performing processing as described in connection with Figure 10 (e.g., steps 1002-1016).

W2 can be serviced, processed or handled by performing processing as described in Figure 11 (e.g., steps 1102-1120). In connection with W2, the initiator node receives an RPC reply from the peer node that owns the second portion of target LAs once the peer node has completed handling W2.

In at least one embodiment, processing of W2 by the peer node can be performed in parallel while the initiator node handles processing of W1. As a variation, processing of W1 and W2 can be performed sequentially in any order.

Once processing of both W1 and W2 have completed, the initiator node can return an acknowledgement regarding successful completion of the single host write I/O to the host or other storage client that sent the write I/O.

FIG. 12

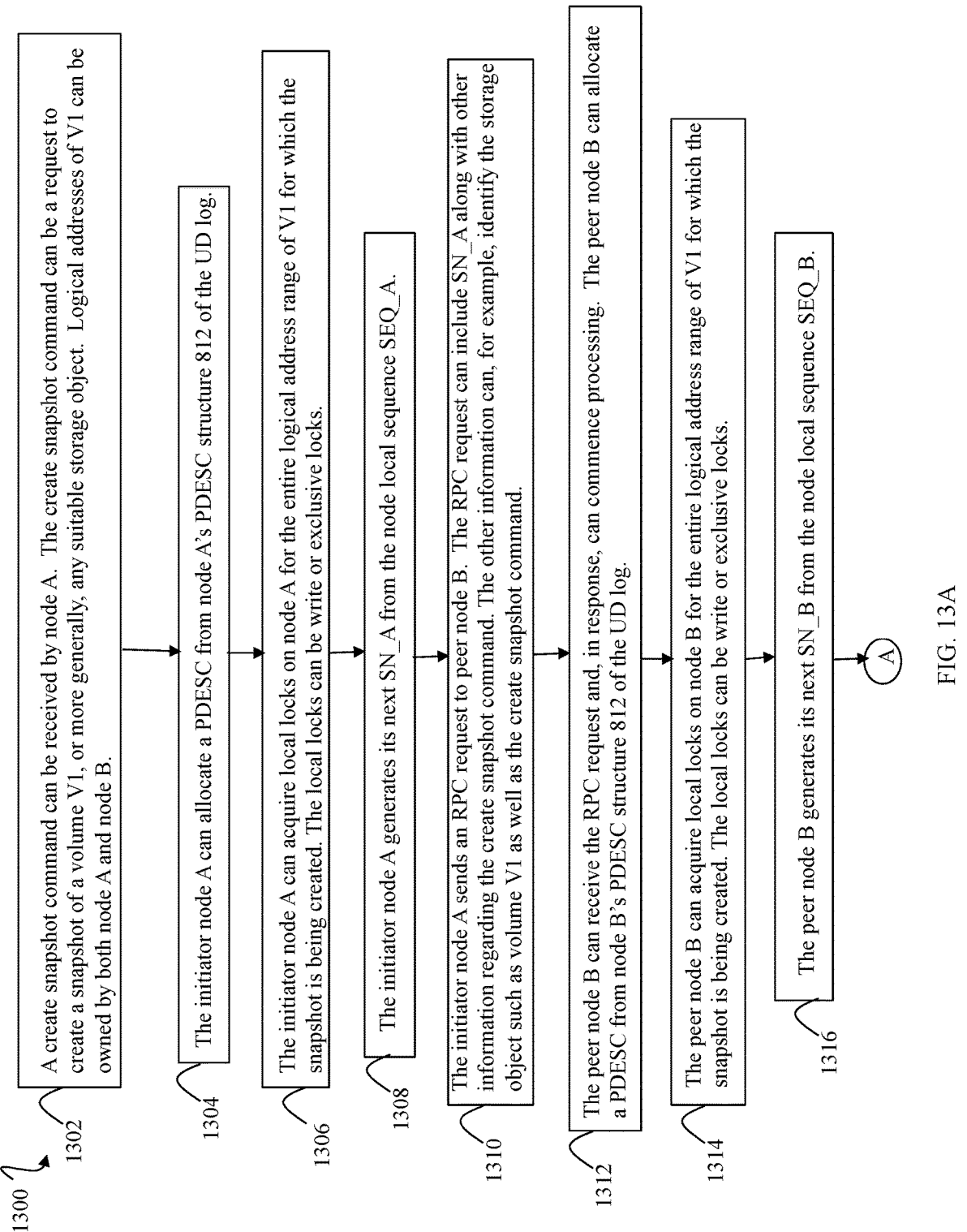

1300

1302 A create snapshot command can be received by node A. The create snapshot command can be a request to create a snapshot of a volume V1, or more generally, any suitable storage object. Logical addresses of V1 can be owned by both node A and node B.

1304 The initiator node A can allocate a PDESC from node A's PDESC structure 812 of the UD log.

1306 The initiator node A can acquire local locks on node A for the entire logical address range of V1 for which the snapshot is being created. The local locks can be write or exclusive locks.

1308 The initiator node A generates its next SN_A from the node local sequence SEQ_A.

1310 The initiator node A sends an RPC request to peer node B. The RPC request can include SN_A along with other information regarding the create snapshot command. The other information can, for example, identify the storage object such as volume V1 as well as the create snapshot command.

1312 The peer node B can receive the RPC request and, in response, can commence processing. The peer node B can allocate a PDESC from node B's PDESC structure 812 of the UD log.

1314 The peer node B can acquire local locks on node B for the entire logical address range of V1 for which the snapshot is being created. The local locks can be write or exclusive locks.

1316 The peer node B generates its next SN_B from the node local sequence SEQ_B.

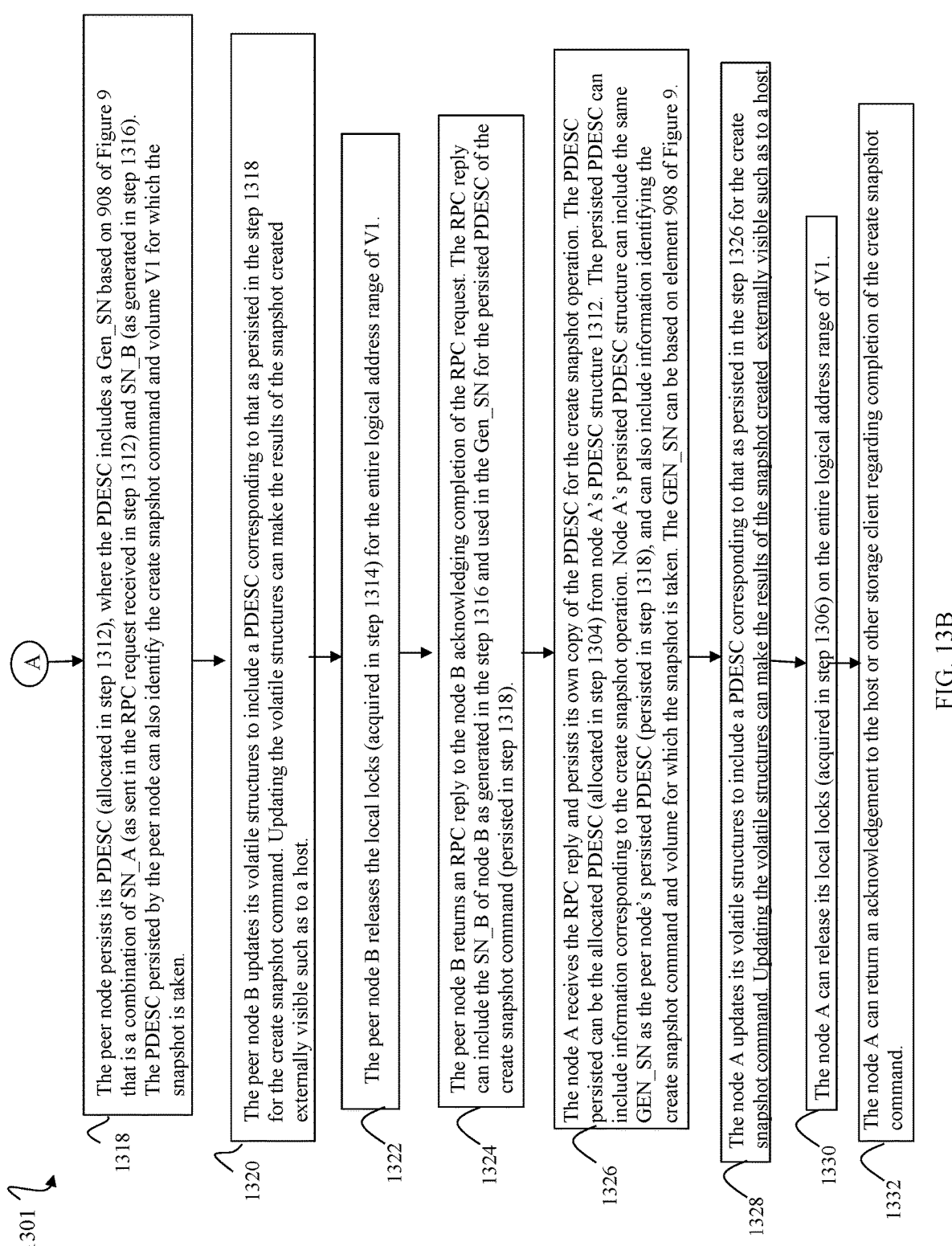

1318  The peer node persists its PDESC (allocated in step 1312), where the PDESC includes a Gen_SN based on 908 of Figure 9 that is a combination of SN_A (as sent in the RPC request received in step 1312) and SN_B (as generated in step 1316). The PDESC persisted by the peer node can also identify the create snapshot command and volume V1 for which the snapshot is taken.

1320  The peer node B updates its volatile structures to include a PDESC corresponding to that as persisted in the step 1318 for the create snapshot command. Updating the volatile structures can make the results of the snapshot created externally visible such as to a host.

1322  The peer node B releases the local locks (acquired in step 1314) for the entire logical address range of V1.

1324  The peer node B returns an RPC reply to the node B acknowledging completion of the RPC request. The RPC reply can include the SN_B of node B as generated in the step 1316 and used in the Gen_SN for the persisted PDESC of the create snapshot command (persisted in step 1318).

1326  The node A receives the RPC reply and persists its own copy of the PDESC for the create snapshot operation. The PDESC persisted can be the allocated PDESC (allocated in step 1304) from node A's PDESC structure 1312.  The persisted PDESC can include information corresponding to the create snapshot operation. Node A's persisted PDESC structure can include the same GEN_SN as the peer node's persisted PDESC (persisted in step 1318), and can also include information identifying the create snapshot command and volume for which the snapshot is taken. The GEN_SN can be based on element 908 of Figure 9.

1328  The node A updates its volatile structures to include a PDESC corresponding to that as persisted in the step 1326 for the create snapshot command. Updating the volatile structures can make the results of the snapshot created  externally visible such as to a host.

1330  The node A can release its local locks (acquired in step 1306) on the entire logical address range of V1.

1332  The node A can return an acknowledgement to the host or other storage client regarding completion of the create snapshot command.

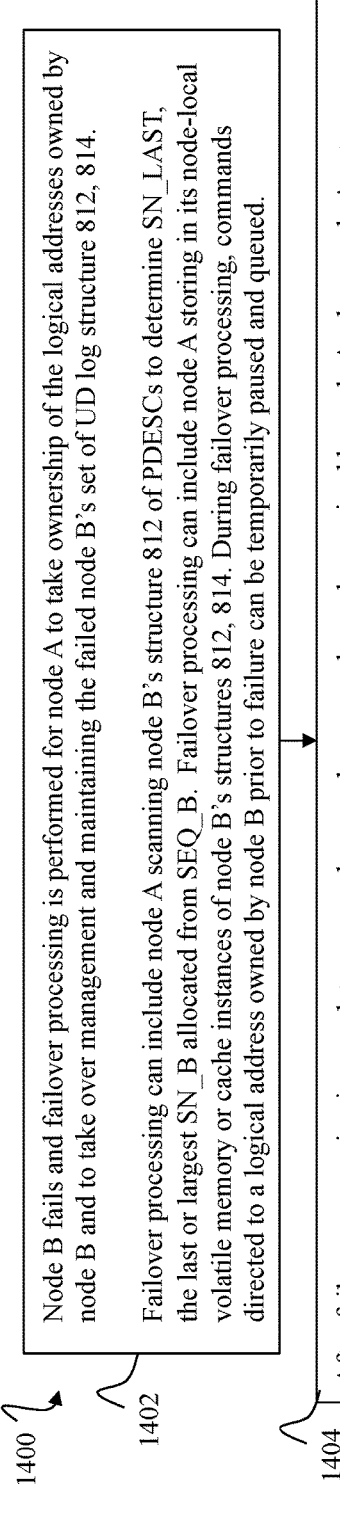

1400

1402 Node B fails and failover processing is performed for node A to take ownership of the logical addresses owned by node B and to take over management and maintaining the failed node B's set of UD log structure 812, 814.

Failover processing can include node A scanning node B's structure 812 of PDESCs to determine SN_LAST, the last or largest SN_B allocated from SEQ_B. Failover processing can include node A storing in its node-local volatile memory or cache instances of node B's structures 812, 814. During failover processing, commands directed to a logical address owned by node B prior to failure can be temporarily paused and queued.

1404 After failover processing is complete, any such queued commands can be serviced by node A where node A acts as a proxy for node B with respect to node B's UD log resources 812, 814 and with respect to generating Gen_SNs using SN_Bs of SEQ_B. As a proxy, node A can manage and maintain node B's UD log resources 812, 814 and can generate Gen_SNs as would be performed by node B if node B were up and running and servicing the write I/O or other command.

1406 After failover processing is complete, node A receives write I/Os or other commands directed to logical addresses LA1 previously owned by node B. For each of the received write I/Os or other commands directed to an LA1 previously owned by node B, node A acts as a proxy for node B with respect to node B's UD log resources 812, 814 and with respect to generating Gen_SNs using SN_Bs of SEQ_B. As a proxy, node A can manage and maintain node B's UD log resources 812, 814 and can generate SN_Bs and Gen_SNs as would be performed by node B if node B were up and running and servicing the write I/Os or other commands.

1408 The failed node B restarts and node failback processing is performed. Node failback processing includes moving ownership of node B's previously owned logical addresses back to node B, and includes node B resuming management and maintenance of node B's UD log structures 812, 814. Node failback processing can include node A sending SNLAST 2 to node B, where SNLAST2 is the last or highest SN_B from SEQ_B allocated by node A while node A acted as a proxy for the failed node B. During node failback processing, writes or other commands directed to logical addresses previously owned by node B/being moved to node B can be paused and queued. After failback processing is complete, any queued writes or other commands directed to logical addresses now owned by node B can be serviced or handled by node B. Also after failback processing is complete, command processing can resume as described in connection with Figures 10, 11, 12, 13A and 13B. After failback processing is complete, node B can resume handling writes or other commands directed to logical addresses owned by node B using SN_LAST2+1 denoting the next SN_B in SEQ_B.

FIG. 14

TECHNIQUES FOR LOG ORDERING TO OPTIMIZE WRITE LATENCY IN SYSTEMS ASSIGNING LOGICAL ADDRESS OWNERSHIP

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a first command at a first node in a system, wherein the system further includes a second node, wherein the first node manages a first set of user data (UD) log resources including a first structure of page descriptors (PDESCs) and second structure of page blocks (PBs), wherein the second node manages a second set of UD log resources including a third structure of PDESCs and a fourth structure of PBs, wherein the first node generates sequence numbers from a first node-local sequence SEQ1 of monotonically increasing integer values greater than zero, where the second node generates sequence number from a second node-local sequence SEQ2 of monotonically increasing integer values greater than zero, wherein a UD log includes the first set of UD log resources and the second set of UD log resources, wherein each command, operation or request recorded in the UD log is associated with a unique corresponding generic serial number (GENSN) that includes a first field F1 with a value corresponding to the first node for the recorded command, operation or request, and that includes a second field F2 with a value corresponding to the second node for the recorded command, operation or request; determining whether the first command is a first write I/O directed to first one or more logical addresses owned exclusively by the first node that received the first command; and responsive to determining the first command is a first write I/O directed to first one or more logical addresses owned exclusively by the first node, performing first processing by the first node to record the first write I/O in the UD log without any internode communication with the second node, the first processing performed by the first node including: generating a first GENSN uniquely identifying the first write I/O, wherein the first GENSN includes a first sequence number SN1 allocated from SEQ1 in F1 and includes a zero value in F2; and recording the first write I/O in the UD log including: storing a first PDESC of the first structure of PDESCs of the first set of UD log resources managed by the first node, wherein the first PDSEC describes the first write I/O, wherein the first PDESC includes the first GENSN uniquely identifying the first write I/O recorded in the UD log.

In at least one embodiment, the first processing performed by the first node can include: storing first content C1 written by the first write I/O in a first PB of the second structure of PBs of the first set of UD log resources managed by the first node, wherein the first PDESC includes a pointer to, reference to, or address of the first PB; and storing copies of the first PB and the first PDESC in volatile memory of the first node. The first processing can include: prior to said storing the first PDESC and prior to said storing copies of the first PB and the first PDESC, acquiring one or more exclusive locks providing the first node exclusive access to the first one or more logical addresses of the first write I/O; releasing the one or more exclusive locks of the first one or more logical addresses after performing said storing the first PDESC and after performing said storing copies of the first PB and the first PDESC; and after said releasing the one more exclusive locks, the first node returning an acknowledgement to a client that sent the first write I/O to the system.

In at least one embodiment, processing can include: determining whether the first command is a second write I/O directed to second one or more logical addresses owned exclusively by the second node that did not receive the first command; and responsive to determining the first command is a second write I/O directed to second one or more logical addresses owned exclusively by the second node that did not receive the first command, performing second processing including: the second node generating a second GENSN uniquely identifying the second write I/O, wherein the second GENSN includes a zero value in F1 and includes a second sequence number SN2 allocated from SEQ2 in F2; and recording the second write I/O in the UD log including: storing, by the second node, a second PDESC of the third structure of PDESCs of the second set of UD log resources managed by the second node, wherein the second PDSEC describes the second write I/O, and wherein the second GENSN is included in the second PDESC. The second processing can include: storing, by the first node that received the second write I/O, first content C1 written by the second write I/O in a first PB of the second structure of PBs of the first set of UD log resources managed by the first node; the first node sending a remote procedure call (RPC)

to the second node, wherein the RPC includes a pointer to, address of, or reference to the first PB; responsive to the second node receiving the RPC from the first node, the second node performing third processing, wherein the third processing includes: the second node acquiring one or more exclusive locks on the second one or more logical addresses of the second write I/O; after the second node acquires the one or more exclusive locks, the second node performing said storing the second PDESC; after the second node performs said storing the second PDESC, the second node storing copies of the first PB and the second PDESC in volatile memory of the second node; after the second node performs said storing the second PDESC and said storing the copies of the first PB and the second PDESC, the second node releasing the one or more exclusive locks of the second one or more logical addresses of the second write I/O; and after the second node releases the one or more exclusive locks, the second node sending an RPC reply to the first node. Responsive to the first node receiving the RPC reply, the first node can send an acknowledgement to a storage client that sent the second write I/O to the system.

In at least one embodiment, processing can include: determining whether the first command is a global command directed to a first set of one or more logical addresses owned by the first node and a second set of one or more logical addresses owned by the second node; responsive to determining the first command is the global command directed to the first set of one or more logical addresses owned by the first node and the second set of one or more logical addresses owned by the second node, performing second processing including: the first node allocating a third sequence number SN3 from SEQ1; the first node acquiring first local locks of the first node for the first set of one or more logical addresses and the second set of one or more logical addresses; the first node sending an RPC to the second node, wherein the RPC includes SN3; and responsive to the second node receiving the RPC, the second node performing third processing including: the second node acquiring second local locks of the second node for the first set of one or more logical addresses and the second set of one or more logical addresses; the second node allocating a fourth sequence number SN4 from SEQ2; the second node storing a second PDESC of the third structure of PDESCs of the second set of UD log resources managed by the second node, wherein the second PDESC describes the global command, wherein the second PDESC includes a second GENSN uniquely identifying the global command, and wherein the second GENSN includes SN3 in F1 and includes SN4 in F2; the second node storing a copy of the second PDESC in volatile memory of the second node; the second node releasing the second local locks of the second node; and the second node returning an RPC reply to the first node.

In at least one embodiment, the second processing can include: responsive to the first node receiving the RPC reply from the second node, the first node performing fourth processing including: storing a third PDESC of the first structure of PDESCs of the first set of UD log resources managed by the first node; storing a copy of the third PDESC in volatile memory of the first node; releasing the first local locks of the first node; and sending an acknowledgement to a client that sent the global command to the system. The global command can be a create snapshot command that creates a snapshot of a storage object including the first one or more logical addresses and including the second one or more logical addresses. The first one or more logical addresses and the second one or more logical addresses can collectively form an entire logical address range of the storage object for which the snapshot is created. The storage object can be any of: a volume, a logical device, a file, a directory, and a file system. The first local locks and the second local locks can be exclusive or write locks.

In at least one embodiment, the global command can be an extended copy (XCOPY) command that performs an internal copy operation within the system from a source location to a target location, wherein said acquiring the first local locks and said acquiring the second local locks includes: acquiring one or more read or shared locks for logical addresses corresponding to the source location; and acquiring one or more write or exclusive locks for logical addresses corresponding to the target location. The first set of UD log resources and the second set of UD log resources can be structures in non-volatile memory used for persistently recording commands, requests and operations in the UD log. The first command can be received from a host or other storage client that is external with respect to the system.

In at least one embodiment, processing can include assigning exclusive ownership of a plurality of logical addresses including the first one or more logical addresses among the first node and the second node. Each of the first node and the second node may only flush recorded commands, operations or requests of the UD log for logical addresses owned by exclusively by said each node. Processing can include: the first node flushing a first plurality of PDESCs of the first structure of PDESCs of the first set of UD log resources managed by the first node in accordance with increased ordering of values of F1 of the first plurality of PDESCs; and the second node flushing a second plurality of PDESCs of the third structure of PDESCs of the second set of UD log resources managed by the second node in accordance with increased ordering of values of F2 of the second plurality of PDESCs.

In at least one embodiment, processing can include: the first node failing; responsive to the first node failing, performing node failover processing, wherein the node failover processing includes the second node taking ownership of all logical addresses owned by the first node, and the second node taking over management of the first set of UD log resources while the first node is down or unavailable, wherein the node failover processing includes the second node scanning PDESCs of the first structure to determine SN_LAST, a largest or last sequence number of SEQ1 allocated by the first node prior to the first node failing; after performing node failover processing and while the first node is down or unavailable, the second node acting as a proxy for the first node such that the second node manages the first set of UD resources and allocates sequence numbers from SEQ1 subsequent to SN_LAST as needed to process received commands, operations or requests recorded in the UD log, wherein SN_LAST2 denotes the last or largest sequence number of SEQ1 allocated by the second node when acting as a proxy for the first node while the first node is down or unavailable; and restarting the first node and performing node failback processing, wherein the node failback processing includes the first node reacquiring ownership of all logical addresses previously owned by the first node prior to the node failover processing, wherein after completing the node failback processing, the first node resumes allocating sequence numbers from SEQ1 commencing with a consecutive next sequence number of SEQ1 subsequent to SN_LAST2.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 9 is an example illustrating generation of unique sequence numbers in at least one embodiment in accordance with the techniques of the present disclosure.

FIGS. 10, 11, 12, 13A, 13B and 14 are flowcharts of processing steps that can be performed in at least one embodiment in accordance with the techniques of the present disclosure.

DETAILED DESCRIPTION OF EMBODIMENT(S)

Figure 1:
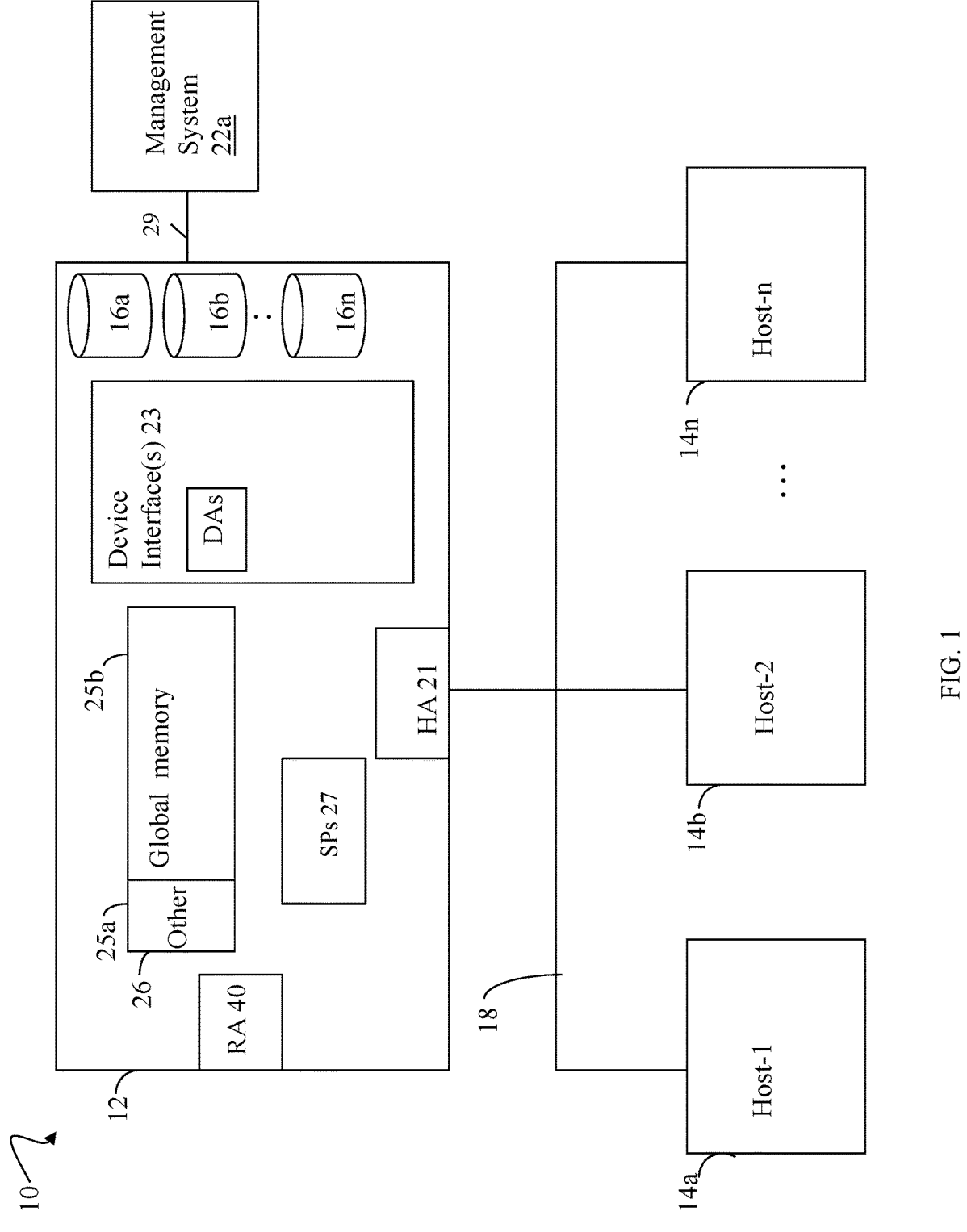
FIG. 1 is an example of components that may be included in a system in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include creating and/or updating one or more the corresponding MD pages which map the logical address to its corresponding BE PD location including the content stored at the logical address. In at least one embodiment, the mapping information including MD pages can thus be updated. For example, such updating of the mapping information can include updating at least one MD page in a chain of MD pages used in connection with mapping the logical address to the BE PD location including the content stored at the logical address.

In at least one embodiment, updating the corresponding mapping information and MD pages can include loading all the MD pages into the cache if any such MD pages are not already in cache. The MD pages of the mapping information can be characterized as a chain forming an access sequence including a top MD page, a mid MD page, a leaf MD page, and a VLB (virtual or virtualized layer block) page, where each page in the foregoing sequence is accessed serially and also in the strict sequential order of the sequence.

Flushing one or more UD log entries or updates to a UD page stored at an existing physical storage location (e.g., on BE PDs) can include determining an updated version of the UD page and storing the updated version of the UD page persistently on non-volatile storage.

The MD pages used in connection with mapping information as noted above can be stored persistently on non-volatile storage. In at least one embodiment, updates to MD pages can also be recorded in a metadata (MD) log that is also flushed and where entries are destaged and applied to persistently stored corresponding MD pages.

In a storage system including multiple nodes that can receive and service write I/Os, latency of write I/Os is highly dependent on the latency of any internode communication performed. Time ordering of operations recorded in the UD log can be denoted using global sequence numbers (GSNs) such that each recorded operation in the UD log has a unique corresponding GSN. Generation and use of GSNs can require internode communication between the nodes of the storage system to guarantee consistent ordering of GSNs across all nodes of the system. For example, one solution can designate a single primary one of the two nodes in the system that is responsible for allocating or generating GSNs in a storage system configuration where both nodes can receive I/O operations. Internode communication can thus be required each time the non-primary node receives a write I/O and contacts the primary node for a new GSN for the write I/O. The foregoing can contribute to increases in write I/O latency.

Accordingly, described in the following paragraphs are techniques that can be used to reduce the frequency or occurrence of internode communication between nodes of the system such as when generating and using sequence numbers that define the time ordering of operations recorded in the UD log. In at least one embodiment, the techniques of the present disclosure can be expected to completely eliminate internode communication for 50% of write I/Os thereby dramatically reducing overall write I/O latency and allowing for an increase in the I/O processing rate (e.g., increase in host I/Os per second or IOPS) of the storage system.

In at least one embodiment, the techniques of the present disclosure provide for each node in the storage system maintaining its own node-local sequence number (SN). Each node-local SN of a single node can be included in a monotonically increasing sequence of numbers tracked, generated and maintained by the single node. Thus, in a dual node system, each of the two nodes can independently maintain and generate its own node-local monotonically increasing stream of SNs. In at least one embodiment where the storage system includes node A and node B, SN_A can denote the current SN generated by node A from node A's node-local sequence number stream SEQ_A; and SN_B can denote the current SN generated by node B from node B's node-local sequence number stream SEQ_B. In at least one embodiment, SEQ_A can be a monotonically increasing sequence of non-zero integers, where each next SN_A at time N+1 in SEQ_A is determined by adding 1 to SN_A of SEQ_A from time N. The foregoing can be formally represented as $SN\_A(N+1)=SN\_A(N)+1$, where $SN\_A(1)$ can be 1, and where $SN\_A(1)$ can denote the first or initial SN in SEQ_A. In at least one embodiment, SEQ_B can be a monotonically increasing sequence of non-zero integers, where each next SN_B at time N+1 in SEQ_B is determined by adding 1 to SN_B of SEQ_B from time N. The foregoing in at least one embodiment can be formally represented as SN_B(N+1)=SN_B(N)+1, where SN_B(1) can be 1, and where SN_B(1) can denote the first or initial SN in SEQ_B.

In at least one embodiment, UD logical addresses can be assigned exclusively to a single one of the nodes A or B. Each UD logical address LA assigned exclusively to a single one of the nodes A or B can be characterized as owned by the single node assigned the particular logical address LA. In at least one embodiment, both nodes A and B can receive I/Os and other commands from an external host. In at least one embodiment, a write I/O directed to a target LA that is received by a node that owns the target LA can service the write I/O locally without any internode communication with the peer node. In at least one embodiment, a write I/O directed to a target LA that is received by a node that is not the owner of the target LA can send a remote procedure call (RPC) to the owning peer node to service or handle the write I/O. In at least one embodiment, logical addresses managed using the techniques of the present disclosure can be partitioned equally, or as equally as possible, between the two nodes A and B such that a first portion of the logical addresses are owned exclusive by node A and a the remaining second portion of the logical addresses are owned exclusively by node B. In such an embodiment where both nodes A and B can receive writes from an external host, it can be expected that approximately 50% of the writes are sent to each of the nodes A and B. In this case in at least one embodiment, writes received by each node can be expected to be owned by the receiving node about 50% of the time, whereby such writes received by the receiving owning node can be serviced locally using the techniques of the present disclosure without any internode communication with the non-owner peer node.

In at least one embodiment, a generic SN or GenSN can have an associated layout including two fields: a first field F1 with a first SN corresponding to node A and a second field F2 with a second SN corresponding to node B. Each GenSN can denote a unique SN associated with a received and recorded operation, command or request recorded in the UD log. Thus the generated sequence of GenSNs using the techniques of the present disclosure can be used to denote the time ordering of recorded operations, commands or requests in the UD log.

In at least one embodiment, if node A receives a write I/O directed to a target LA and owns the target LA, node A can service the write I/O locally without any internode communication with node B. In at least one embodiment, if node A receives a write I/O directed to the target LA owned by node A, node A can allocate GenSN for the write I/O locally where F1 has a value of the next unique sequence number, SN_A, in node A's local sequence SEQ_A, and where F2 has a zero value. Thus in at least one embodiment, the recorded write I/O of the UD log having a corresponding GenSN with a non-zero value in field F1 and a zero value in field F2 indicates that node A is the owner of the target LA of the recorded write I/O and node A can service the write I/O locally.

In at least one embodiment, if node B receives a write I/O directed to a target LA and owns the target LA, node B can service the write I/O locally without any internode communication with node A. If node B receives a write I/O directed to a target LA and node B owns the target LA, node B can allocate GenSN for the write I/O locally where F1 has a zero value, and where F2 has a value of the next unique sequence number, SN_B, in node B's local sequence SEQ_B. Thus in at least one embodiment, a recorded write I/O of the UD log having a corresponding GenSN with a non-zero value in field F2 and a zero value in field F1 indicates that node B is the owner of the target LA of the recorded write I/O and node B can service the write I/O locally.

In at least one embodiment, if node A receives a write I/O directed to a target LA owned by node B, node A can issue an RPC to the owning node B to service the write including having the owner node B locally allocate a Gen_SN for the write I/O locally on node B where F1 has a zero value, and where F2 has a value of the next unique sequence number, SN_B, in node B's local sequence SEQ_B. Thus in at least one embodiment, a recorded write I/O of the UD log having a corresponding GenSN with a non-zero value in field F2 and a zero value in field F1 indicates that node B is the owner of the target LA of the recorded write I/O.

In at least one embodiment, if node B receives a write I/O directed to a target LA owned by node A, node B can issue an RPC to the owning node A to service the write including having the owner node A locally allocate a Gen_SN for the write I/O locally on node A where F2 has a zero value, and where F1 has a value of the next unique sequence number, SN_A, in node A's local sequence SEQ_A. Thus in at least one embodiment, a recorded write I/O of the UD log having a corresponding GenSN with a non-zero value in field F1 and a zero value in field F2 indicates that node A is the owner of the target LA of the recorded write I/O.

In at least on embodiment, servicing a write I/O directed to a target LA owned by a node can include acquiring the needed one or more address locks for the target LA. In at least one embodiment where the write I/O directed to the target LA is received by the node that owns the target LA, the owner node of the target LA can acquire any needed locks corresponding to the target LA using local locks of the owner node without the need for internode communication with the non-owner node B. In at least one such embodiment, where the owner node of the target LA receives the write I/O directed to the target LA, there is no need to acquire any local locks for the target LA from the peer node.

In at least one embodiment, one or more other supported commands, requests or operations can be characterized as global in that coordination, synchronization and communication is needed between both nodes A and B in the system, where an internode RPC can be issued in connection with servicing such supported commands as part of synchronization and coordination between the nodes A and B. In at least one embodiment, servicing such other supported commands characterized as global can include acquiring or locking resources of both nodes rather than for only a single one of the nodes. In at least one embodiment, other supported commands characterized as global can include a create snapshot command to create as snapshot of a storage object having a first portion owned exclusively by node A and a second portion owned exclusively by node B. For example in at least one embodiment, the storage object can be a volume or logical device V1 where a first portion of the logical addresses of V1 are exclusively owned by node A and the remaining second portion of the logical addresses of V1 are owned exclusively by node B. In at least one embodiment creating or taking the snapshot of V1 can include locking both the first portion and the second portion of logical addresses of V1 owned respectively by nodes A and B. In at least one embodiment, creating the snapshot of V1 can include acquiring exclusive access or locks to both the first portion and second portion of logical address of V1 owned respectively by nodes A and B, where such acquired exclusive locks of the first and second portions can be local to their respective owning node. For such a global operation such as creating a snapshot of V1 in at least one embodiment, processing can include recording the create snapshot of V1 operation in the UD log with a corresponding GenSN where the field F1 has a value of the next unique sequence number, SN_A, in node A's local sequence SEQ_A; and where the field F2 has a value of the next unique sequence number, SN_B, in node B's local sequence SEQ_B. Thus in at least one embodiment, a recorded create snapshot operation of the UD log having a corresponding GenSN with a non-zero value in field F1 and a non-zero value in field F2 indicates that the recorded operation is a global operation, indicates that servicing the global operation includes acquiring resources or locks on both nodes A and B, and indicates that servicing the recorded operation includes performing internode communication to acquire the necessary locks and also generate the corresponding GenSN for the create snapshot operation.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25*b* is used to facilitate data transfers and other communications between the device interfaces, the HAs and/or the RAs in a data storage array. In one embodiment, the device interfaces 23 performs data operations using a system cache included in the global memory 25*b*, for example, when communicating with other device interfaces and other components of the data storage array. The other portion 25*a* is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a*-*n* also through the channels. The host systems 14*a*-*n* do not address the drives or devices 16*a*-16*n* of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* used to manage and monitor the data storage system 12. In one embodiment, the management system 22*a* is a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
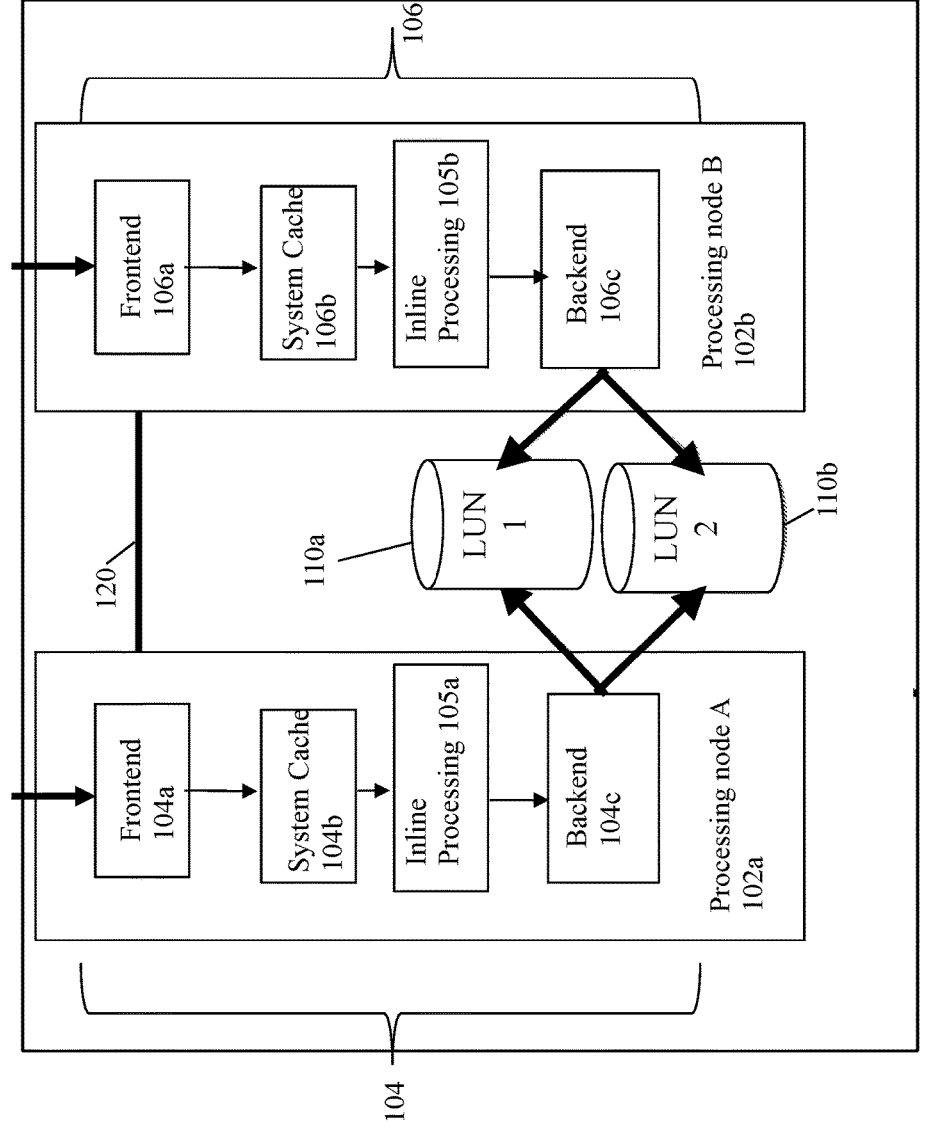
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
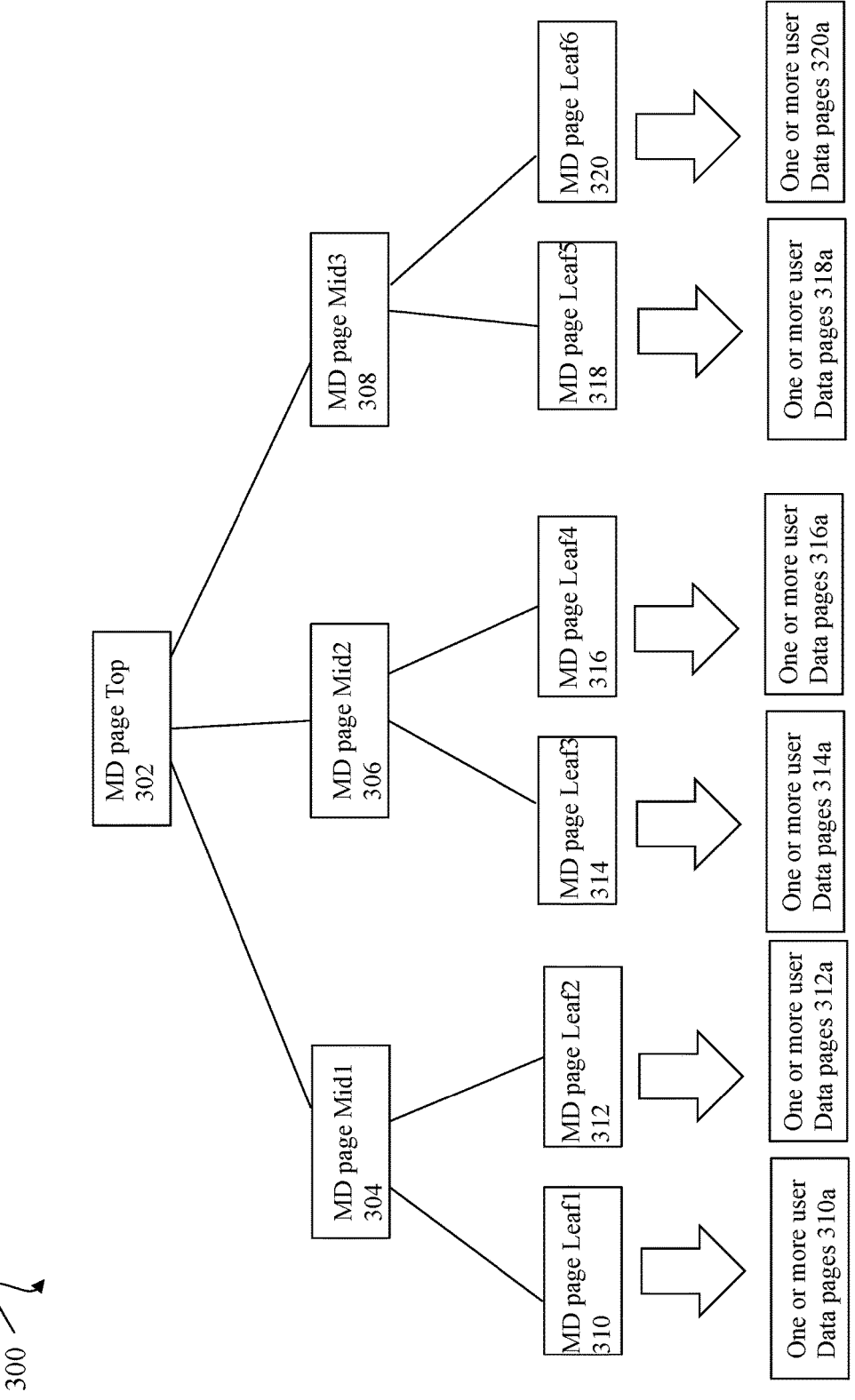
FIGS. 3, 4, and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log such as a user data (UD log), each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
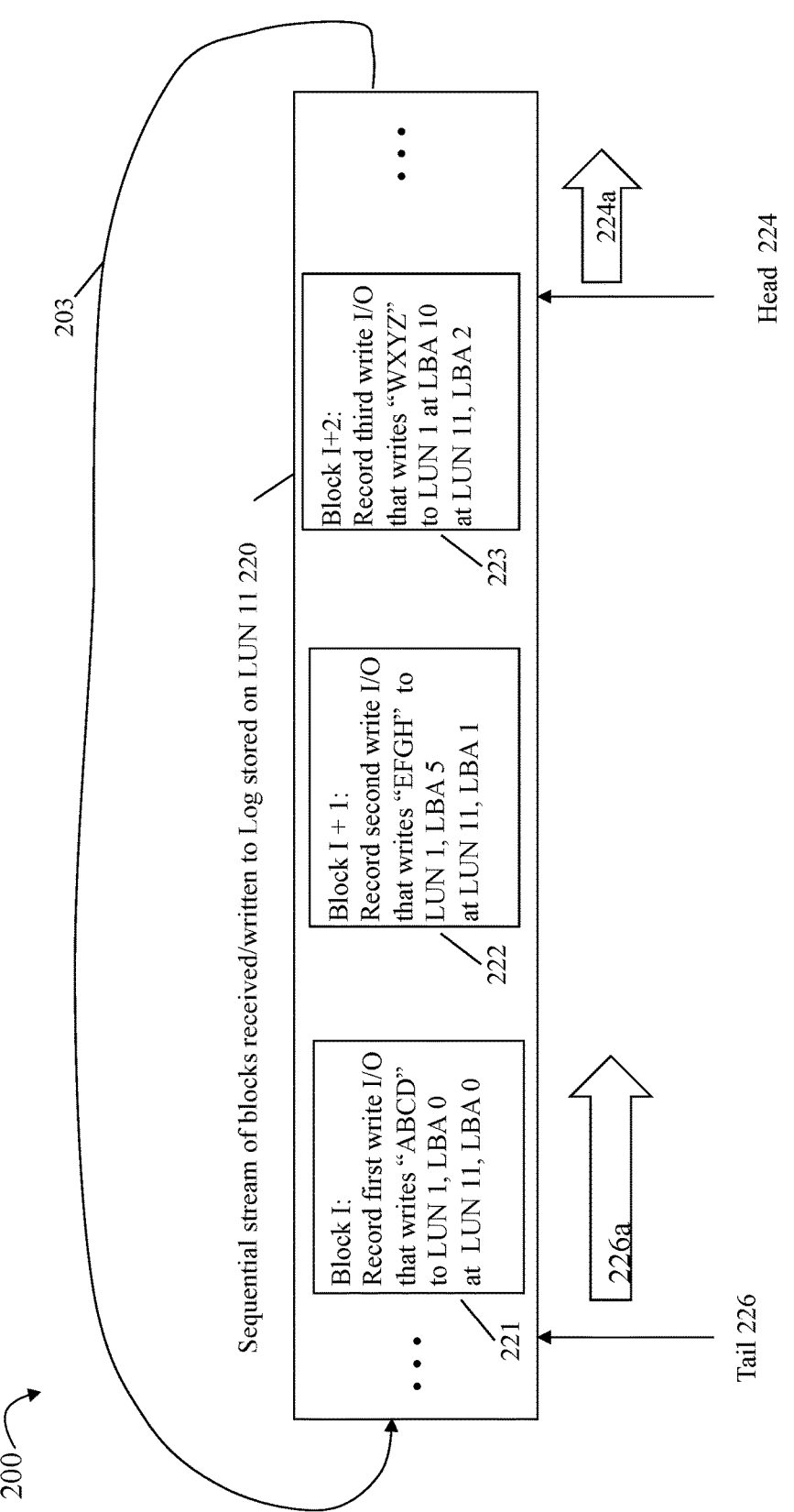
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation.

The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
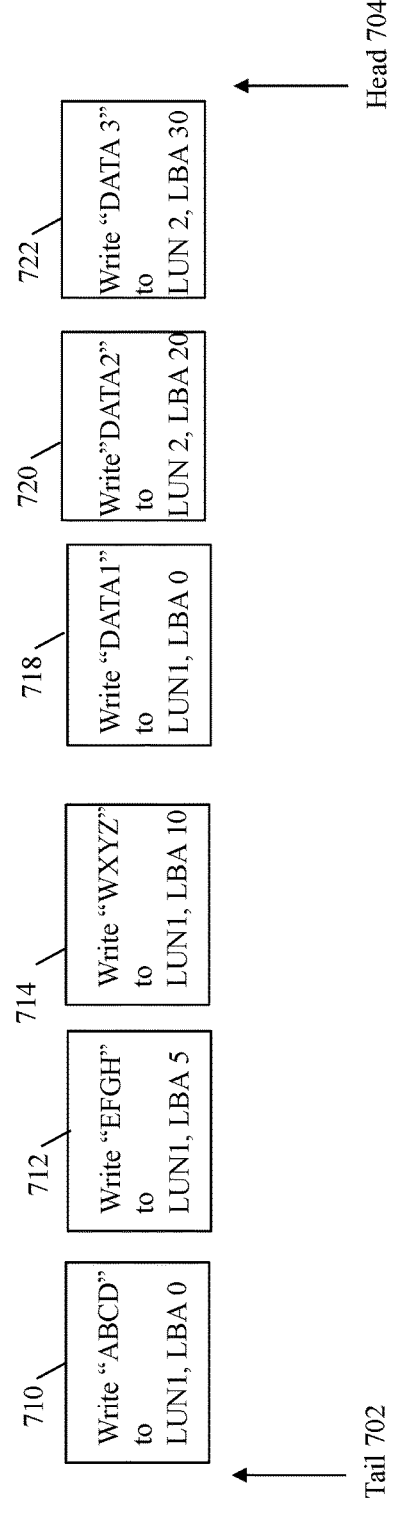

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
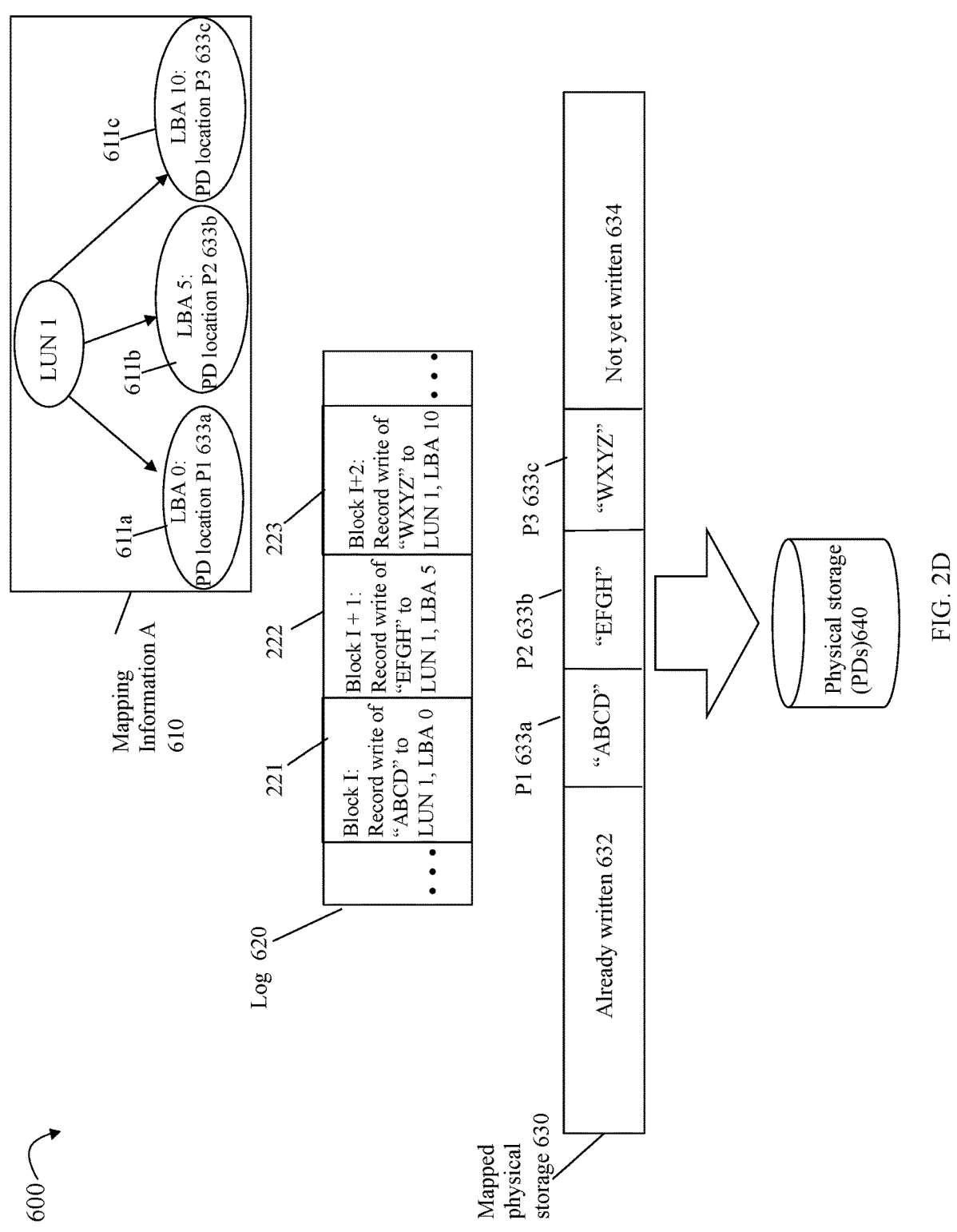

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid 1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid 1 304, and MD page leaf 2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid 1 304, and MD page leaf 2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid 2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
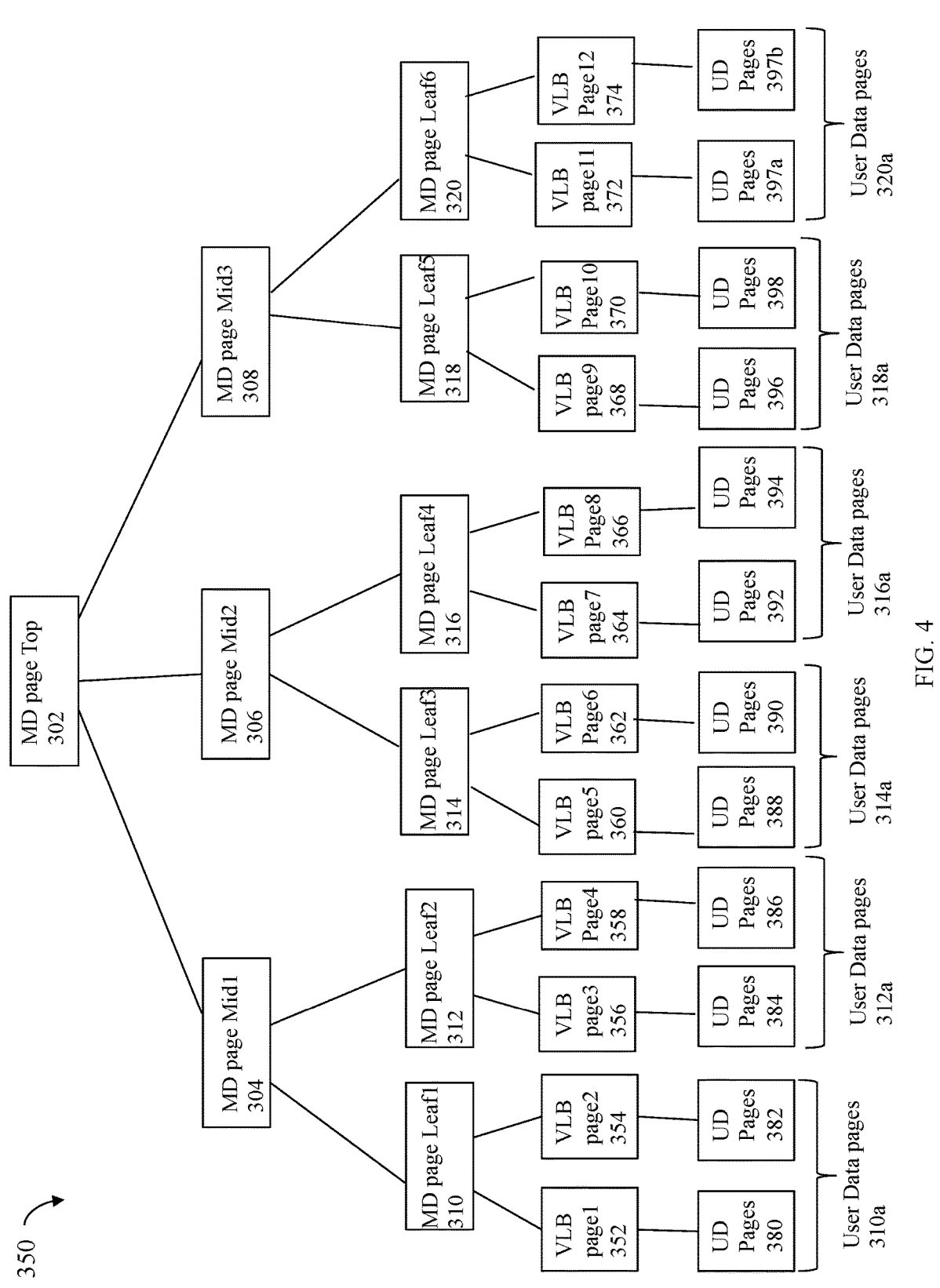

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page 3 356.

Figure 5:
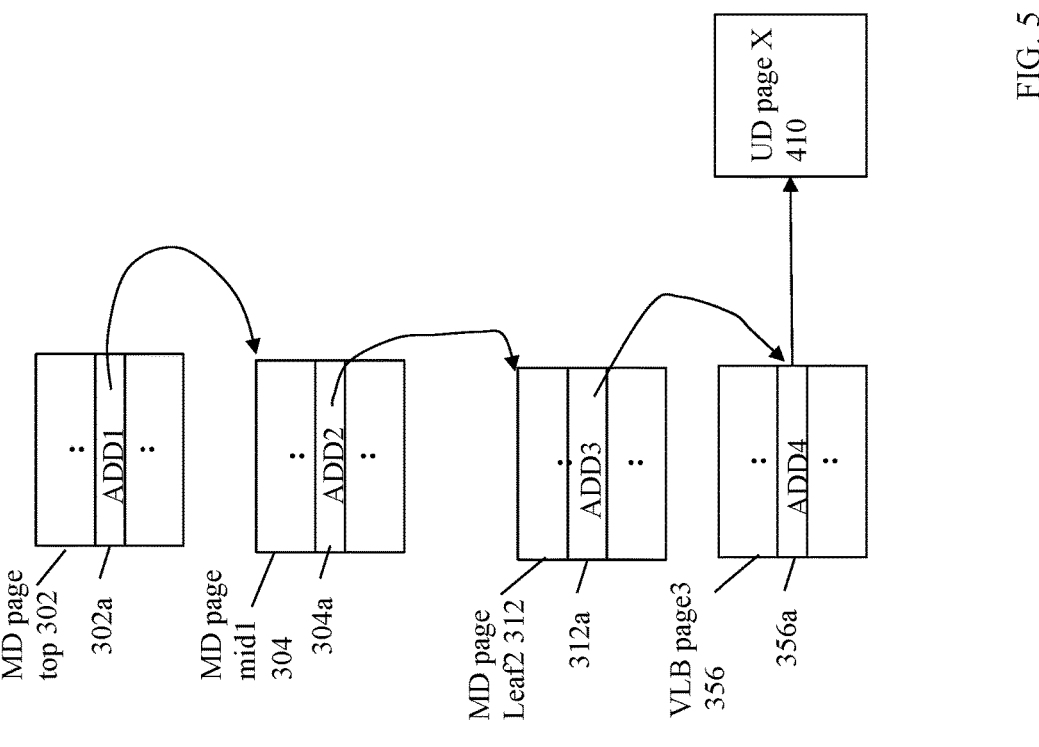

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page 3 356. In the example 400, MD page top 302 includes an entry or address 302a that points to or references the MD page mid 1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid 1 304, that is accessed next in the sequence.

Continuing with the example 400, the MD page mid 1 304 can be accessed where the location 304a is read to obtain the address or pointer ADD2 from location 304a. In at least one embodiment, the particular entry or offset 304a of the MD mid 1 page can be determined based on the logical address being mapped. The address or pointer ADD2 can then be used to identify the particular leaf level MD page, such as MD page leaf 2 312, that is next accessed in the sequence. If the MD page mid 1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf 2 page 312 can be determined based on the logical address being mapped. The location 312a of the MD page leaf 2 312 can be accessed and read to obtain the address or pointer ADD3 from location 312a. The address or pointer ADD3 can then be used to identify a particular entry of a VLB page, such as the entry 356a of the VLB page 3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally in at least one embodiment, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

In some contexts herein, a node which receives an I/O operation can be referred to as the initiator node with respect to that particular I/O operation. In some contexts herein, a node can also be referred to as an initiator with respect to initiating sending a message or request to a peer node, where the peer node can be referred to as a target with respect to the message or request. In response to receiving the message or request, the target node can perform processing to service the request or received message, and then send a reply, response or return message to the initiator.

In at least one embodiment, an architecture can be utilized which partitions ownership of the logical address space of user data or content among the multiple processing nodes of a system such as among the nodes A and B 102a-b of FIG. 2. Thus, each node can be the owner of a certain subset of user logical addresses. In at least one embodiment, a node assigned a particular logical address LA can be designated as the exclusive owner of the logical address LA. In at least one embodiment, mapping information can be used to map LA to a corresponding physical address or location PA including the content C1 of LA.

Figure 6:
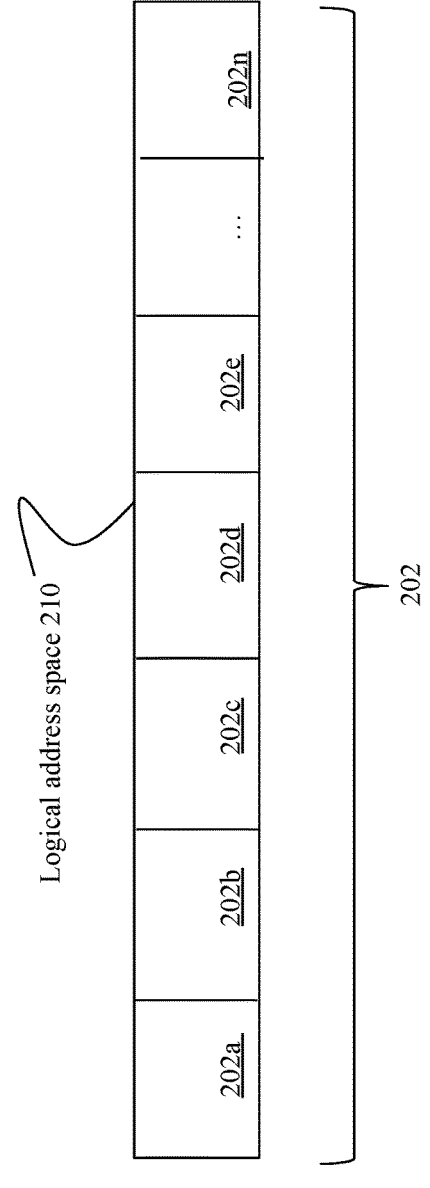
FIG. 6 is an example illustrating a partitioned logical address space in at least one embodiment in accordance with the techniques of the present disclosure.

In at least one embodiment in accordance with the techniques of the present disclosure and with reference to the example 201 of FIG. 6, the user data (UD) logical address space 210 can be partitioned into multiple portions 202, such as denoted by multiple logical address portions 202a-n. Each of the logical address portions 202a-n can be a same size, such as 2 MB (megabytes), 4 MB or any other suitable size. The multiple address space portions 202a-n can then be divided among the two nodes in any suitable manner such that a first of the nodes, such as node A, is assigned exclusive ownership of a first set of the logical address portions and a second of the nodes, such as node B, is assigned exclusive ownership of a second set of logical address portions.

The logical address space 210 can denote an associated logical address space of any one or more storage objects or storage space. The one or more storage objects can include, for example, one or more volumes, logical devices or LUNs; one or more sub-LUN portions; and/or one or more file systems. Generally, the logical address space 210 can denote a contiguous range of consecutive logical addresses so that each of the logical address portions 202a-n is mapped to a unique subrange of consecutive logical addresses of the logical address space 210. For example, consider an embodiment where each of the portions 202a-n is 2 MB in size. In this case, the portion 202a can include all logical addresses x in the subrange $0 \leq x < 2$ MB; the portion 202b can include all logical addresses x in the subrange 2 MB$\leq$x$<$4 MB; and so on.

The logical address portions 202 can be partitioned into two sets where each logical address portion is included in only one of the two sets. The logical address portions 202 can be partitioned equally or unequally between the two nodes A and B. For example, in at least one embodiment, the entire logical address range 210 can be divided equally in half, where node A is assigned the exclusive ownership of the portions of a first half of the address range 210, and where node B is assigned the exclusive ownership of the portions of the second half of the address range 210. As another example, the logical address portions 202 can be equally partitioned into two sets such as based on even or odd logical addresses. The first data set assigned to node A can include logical address portions having an associated starting logical address which is even; and the second data set assigned to node B can include logical address portions having an associated starting logical address which is odd.

In at least one embodiment, the logical address portions of the contiguous logical address range can alternate in connection with exclusive ownership assignment among the nodes A and B. For example, the first portion 202a can be assigned to node A, the second portion 202b can be assigned to node B, the third portion 202c can be assigned to node A, the fourth portion 202d can be assigned to node B, and so on. However more generally, ownership of the logical addresses of the logical address space 202 can be partitioned in any suitable manner among the nodes A and B in an embodiment in accordance with the techniques of the present disclosure.

Although particular embodiments are described herein where node A and node B can be assigned ownership of alternating slices, more generally, the techniques of the disclosure can be used in connection with any suitable technique that assigns logical address or storage object portion ownership among the nodes A and B. Such portions assigned for exclusive ownership to each node can be any suitable size or granularity such as a sub-LUN slice or sub-storage object portion noted above as well as other suitable ownership assignment storage units. For example in at least one embodiment, exclusive ownership can be assigned to nodes A and B by assigning portions or units each corresponding to individual storage objects and/or groups of multiple storage objects.

In at least one embodiment, the techniques of the present disclosure can be used in connection with write I/O commands as well as other commands, requests or operations that can update, modify and/or write content, and where such other commands, requests or operations are recorded in the UD log. In at least one embodiment, such other commands can include an XCOPY (extended copy) operation or command. The XCOPY command can more generally denote an offload copy operation performed internally within the storage system where the source and destination of the copy are within the same storage system or appliance. At least initially after performing the XCOPY operation, the source and target or destination of the XCOPY operation include the same content or data.

In at least one embodiment, flushing or destaging the XCOPY operation from the UD log can be implemented as a MD operation that copies needed mapping information from the chain of MD pages for the source location or address range. In at least one embodiment for an XCOPY recorded in the UD log, flushing or destaging the XCOPY from the UD log can include recording in the MD log MD updates needed to establish second mapping information mapping the target address range or locations to corresponding physical storage locations of content currently stored at sources addresses. In at least one embodiment, establishing the second mapping information for the XCOPY target can include copying at least some corresponding metadata from first mapping information used to map the source location or address range to content stored at source addresses of the source location or address range.

In at least one embodiment, the techniques of the present disclosure can be used in connection with snapshot commands, such as a create snapshot command, that are recorded in the UD log. In at least one embodiment, a create snapshot command can be issued, such as by a user issued control path command, to create a snapshot of a storage object. The storage object can generally be any supported storage object of the storage system. For example in at least one embodiment, the supported storage object(s) for which a snapshot can be created can include any of the following: a logical device or volume (e.g., LUN), a file, a file system, a directory, and/or a group of entities (e.g., multiple files, multiple directories, multiple file systems, or multiple logical devices or volumes).

In at least one embodiment, various types of locks can be supported in connection with a UD logical address or storage granularity such as for a logical block address (LBA) or other suitable storage unit granularity. In at least one embodiment for a UD logical address LA, types of locks can include: a shared lock or read lock of the LA and; an exclusive lock or write lock of the LA. The shared or read lock of an LA allows the holder of the shared lock read access only but not write access to the LA. There can be multiple simultaneous shared locks on the same LA held by different threads, processes or transactions such that all such shared lock holders can simultaneously have read access, but not write access, to the same LA. The write or exclusive lock of an LA allows the holder of the exclusive lock exclusive access to the LA providing the exclusive lock holder exclusive read and write access to the LA. While a reader holds a shared or read lock on an LA, no writer can acquire or hold the exclusive or write lock on the same LA but other readers can acquire a read or shared lock on the same LA. While a writer holds the exclusive or write lock on the LA, no other writer can acquire the write lock on the same LA and no reader can acquire a read lock on the same LA.

In at least one embodiment in accordance with the techniques of the present disclosure, write operations, as well as other supported operations some of which are discussed herein, can be recorded in the UD log using different structures. A first structure of the UD log can include records of the data written by the received write operations, and a second structure of the UD log can include records that are descriptors for the received write operations. For example, the write operation data or payload can be stored in a record of the first structure in the UD log. Additionally, a descriptor for the write operation can be stored in a record of the second structure in the UD log, where the descriptor can reference a record in the first structure including the write data written by the write operation.

In at least one embodiment, the first structure of logged data can be a structure of page blocks (PBs) where each PB includes the write data of a single logged write data block. The second structure of logged descriptors can be a structure of page descriptors (PDESCs) where each PDESC includes a descriptor of a single logged request such as a write operation. For a write operation that writes a block of data, the logged write operation can be described by a PDESC of the log, the data written can be stored in a PB of the log, and the PDESC of the log can include a reference to the PB containing the data written.

In some systems, other commands, requests or operations in addition to write operations can be recorded in the log using PDESCs where such PDESCs of these additional requests or operations may not have an associated PB. For example, in at least one embodiment, other commands, requests or operations that can be recorded in the log using a PDESC that does not have an associated PB can include XCOPY (extended copy) commands and snapshot commands or operations such as create snapshot commands.

In at least one embodiment, the size of each PB can generally be much larger than each PDESC. For example, in at least one embodiment, each PB can be 4K bytes or 8K bytes in size, and each PDESC can be ½ Kbyte or smaller. Thus generally in at least one embodiment, the total amount of storage used for the PBS of the log can be much greater than the total amount of storage used for the PDESCs of the log.

In at least one embodiment, the process of flushing the log includes flushing PDESCs and any associated PBs of the log. In at least one embodiment, a recorded write I/O of the log can be represented using a PDESC-PB pair, where the PDESC of the pair describes the write I/O and points to or references the PB of the pair storing the content or data written. In at least one embodiment, flushing the log can include flushing the PDESC-PB pairs as well as any PDESCs that may not have any associated PB. As each PDESC-PB pair and/or PDESC is flushed from the log, the log space associated with the flushed PDESCs and PBs can be freed and reclaimed for reuse.

In at least one embodiment, the PBs can be organized and maintained as a pool while the PDESCs can be organized and maintained as a ring buffer. Alternatively in at least one embodiment, the PDESCs can be organized and maintained as a first ring buffer, and the PBs can be organized and maintained as a second ring buffer.

In at least one embodiment, the PDESC ring or ring buffer can be implemented as an array or linked list where each PDESC entry in the ring buffer can have an associated sequence number or identifier. In embodiments where the PBs are maintained as a ring buffer, the PB ring buffer can also be implemented as an array or linked list. Unique monotonically increasing sequence numbers or identifiers can be assigned to PDESC entries as they are used to log operations, such as write operations. The sequence numbers can denote the time dependent ordering of the logged operations or requests. A PDESC that generally references a PB can be referred to as a PDESC-PB pair where the PB of the pair contains the content stored at the logical address included in the PDESC of the pair.

In at least one embodiment where the PBs are implemented as PB pool can be implemented using an array or linked list of PB entries. In one embodiment, a list of PBs can be denoted as a list of indices associated with the PBs. A bit vector can include a different bit for each PB, where the bit associated with a PB has a value of 1 when the PB is allocated and the bit associated with the PB otherwise has a value of 0 when the PB is unallocated or free. Once a PB is flushed, it can be reclaimed or released immediately by indicating that its associated index or bit in the bit vector denotes the state of unallocated or free (e.g., where the bit is set to 0). Thus, using the PB pool rather than a PB ring buffer has no dependencies, problems or constraints that can occur, for example, due to tail pointer management of the ring buffer. With a PB pool, each PB can be released or reclaimed immediately after the data of the PB has been flushed or destaged to a BE PD.

In at least one embodiment as noted above, PDESCs can be organized and maintained in a ring buffer structure that is generally a logical ring of records or entries as described below in connection with FIG. 7. In at least one embodiment as noted above, PBs can also be organized and maintained in another separate ring buffer structure that is also generally a logical ring of records or entries as described below in connection with FIG. 7. The ring buffer can be maintained using pointers, such as a head pointer and a tail pointer, where new entries of the ring can be allocated from the head and space reclamation can be done from the tail. When an entry at the tail is flushed, the entry can be freed and thus reclaimed for reuse. The tail can be advanced as entries are flushed. In a similar manner, as entries are allocated, the head pointer is advanced. Although particular structures, such as a ring buffer, array, and/or pool, are described herein, more generally, any suitable structure and/or organization can be utilized with the PBs, PDESCs, and UD log structures in accordance with the techniques of the present disclosure.

Figure 7:
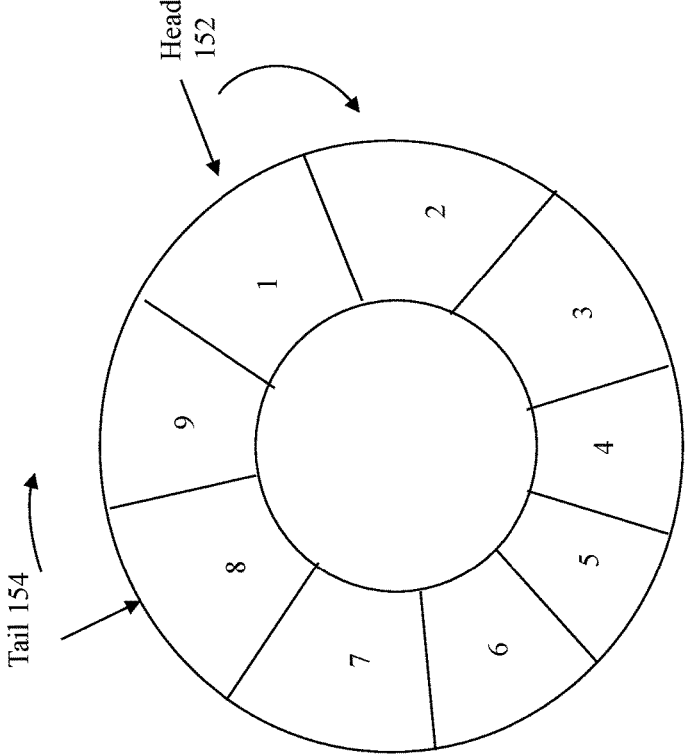
FIGS. 7 and 8 are examples illustrating structures in at least one embodiment in accordance with the techniques of the present disclosure.

Referring to FIG. 7, shown is an example 150 illustrating a ring buffer. The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. The tail pointer 154 can denote the entry in the ring buffer that is to be flushed next or is currently being flushed. For example, the tail pointer 154 is currently pointing to entry 8. Once entry 8 is flushed, the tail pointer 154 is advanced to entry 9 that is flushed. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array where, for example, the entries 1 through 9 as in FIG. 7 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in FIG. 7.

It should be noted that the flushing of the log can be performed in response to an occurrence of any one or more defined conditions. For example, the log can be flushed in response to determining that the amount of reclaimed log space available for use and allocation is less than a specified threshold amount or size. As another example, the log can be flushed in response to determining that the amount of reclaimed PB space available for use and allocation is less than a specified threshold amount or size. As another example, the log can be flushed in response to determining that the amount of reclaimed PDESC space available for use and allocation is less than a specified threshold amount or size.

Figure 8:
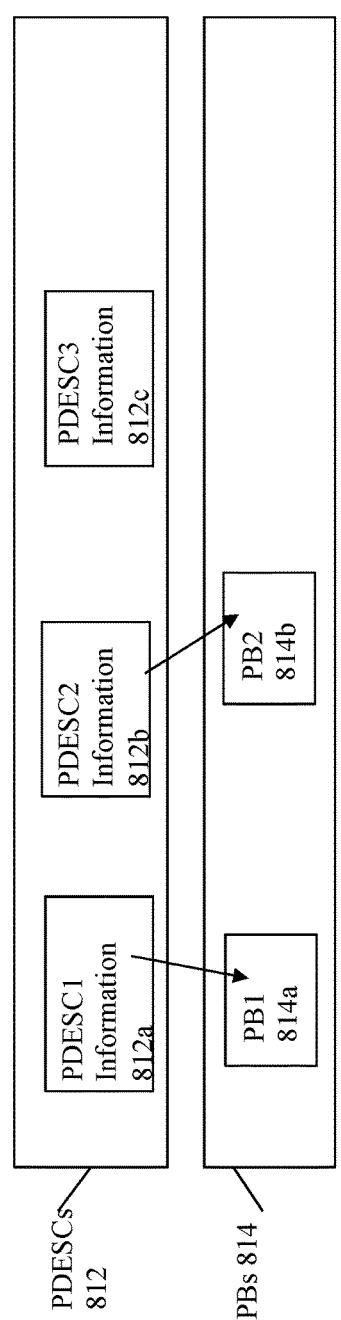

Referring to FIG. 8, shown is an example 800 illustrating structures of PBs and PDESCs used in at least one embodiment in accordance with the techniques of the present disclosure.

The example 800 includes a pair of structures 812, 814 that can be maintained in persistent non-volatile memory for each node. Thus for example with a dual node system such as in FIG. 2, node A can have its own instances of structures 812, 814, and node B can have its own instances of structures 812, 814, where the persisted UD log therefore includes two instances of the two sets of structures 812, 814 for the nodes A and B (e.g., node A maintains and manages a first set of structures 812, 814; and node B maintains and manages a second different set of structures 812, 814).

The structure 812 can denote a structure of PDESCs, such as a ring buffer of PDESCs in at least one embodiment. The structure 814 can denote a structure of PBs, such as a pool of PBs in at least one embodiment. The example 800 includes a first PDESC-PB pair 812a, 814a for a first write I/O W1; a second PDESC-PB pair 812b-814b for a second write I/O W1; and a single PDESC 812c for a third operation or command that does not have a corresponding PB. In at least one embodiment, the third operation or command can be a create snapshot command or an XCOPY command or operation discussed elsewhere herein. The PDESC 812a can include information describing the first write I/O W1 recorded in the log, where W1 writes content C1 to the target logical address LA1, and where the PDESC 812a can include: the target logical address LA1, a pointer or reference to PB 814a that stores C1, and a sequence number GenSN generated in accordance with the techniques of the present disclosure. The PDESC 812b can include information describing the second write I/O W2 recorded in the log, where W2 writes content C2 to the target logical address LA2, and where the PDESC 812b can include: the target logical address LA2, a pointer or reference to PB 814b that stores C2, and a sequence number GenSN generated in accordance with the techniques of the present disclosure.

In at least one embodiment where the third operation or command is an XCOPY command denoted by the PDESC 812c, the PDESC 812c can include: the source logical address range of content, the target logical address range of where the source logical address range content is copied to, and a sequence number GenSN generated in accordance with the techniques of the present disclosure.

In at least one embodiment where the third operation or command is a create snapshot command denoted by the PDESC 812c, the PDESC 812c can include: information identifying the storage object for which the snapshot is created, and a sequence number GenSN generated in accordance with the techniques of the present disclosure.

Further details regarding generating GenSNs in accordance with the techniques of the present disclosure are described in more detail elsewhere herein. In at least one embodiment, the GenSN for a recorded write I/O can be based, at least in part, on the particular node that owns the target address LA written to by the write I/O.

In at least one embodiment as noted above with a dual node storage system, node A can have its own first set of structures 812, 814; and node B can have its own second set of structures 812, 814. Thus in at least one embodiment, each node can maintain its own exclusive set of persistent UD log resources including an instance of the structures 812, 814. In such an embodiment when the system is running in normal mode (e.g., normal operating conditions) with both nodes up and running, only node A can be allowed to maintain, allocate storage from, and write to, its first set of structures 812, 814; and only node B can be allowed to maintain, allocate storage from, and write to its second set of structures 812, 814. Thus each node can maintain its own UD log resources including the node-specific set of structures 812, 814. In at least one embodiment, each node can be allowed to read content from the other peer node's set of structures 812, 814. In at least one embodiment each node (but not the peer node) can exclusive write to its own structure 812 of PDESCs 812 and its own structure 814 of PBs; and both nodes can have read access to its own set of structures 812, 814 and also have read access to the peer node's set of structures 812, 814.

In at least one embodiment, each node can persistently store PDESCs in its corresponding structure 812 with respect to write I/Os recorded in the log or UD log for logical addresses owned by the node. In at least one embodiment, each node can persistently store PDESCs in its corresponding structure 812 with respect to other supported commands, requests or operations, such as creation snapshot and XCOPY commands, recorded in the log or UD log where the node owns at least some of the corresponding logical addresses impacted by recorded commands. Thus in at least one embodiment, a node does not persistently store PDESCs in its corresponding structure 812 for commands, operations or requests that only include corresponding logical addresses owned by the other peer node.

In at least one embodiment, the techniques of the present disclosure can be used to generate GenSNs where a unique GenSN can be used to uniquely identify each recorded command, operation or request of the UD log. In at least one embodiment, GenSNs can be used to track operation dependencies and relative ordering of recorded operations of the UD log.

Consistent with discussion herein in at least one embodiment, other commands (e.g., XCOPY and create snapshot commands) besides write I/Os can be recorded in the UD log where only a PD is allocated and written without any reference to a PB. In this case, using a PDESC without a corresponding PB can be used to mark an occurrence of an event or dependency to track correct operation time ordering. Thus in at least one embodiment, each PDESC of the UD log can include a GenSN even if the PDESC is not associated with a corresponding PB.

In at least one embodiment, GenSNs of PDESCs for recorded operations or commands can define the relative time ordering of the recorded operations and can be used, for example, in connection with recovery after performing a restart.

The techniques of the present disclosure provide for reduced write I/O latency specifically on the owner node by allowing completely local processing of write I/Os directed to target LAs where the writes are received by the node that owns the target LAs. In at least one embodiment where it can be expected that each of the nodes A and B receive 50% (e.g., within specified tolerances) of the writes and where the each node is assigned ownership of 50% of the write target logical addresses, a node that receives a write I/O and owns the target LA of the write I/O can process the write I/O locally without any internode communication with the non-owning peer node.

What will now be described in more detail is generation and use of GenSNs in at least one embodiment in accordance with the techniques of the present disclosure.

For purposes of illustration, assume that nodes A and B are assigned ownership of alternating contiguous logical address portions such as described in connection with FIG. 6. For example with reference back to FIG. 6, logically contiguous address portions or slices can be assigned an integer slice identifier or ID beginning with 1, where subsequent consecutive contiguous logical address portions are assigned subsequent consecutive sequential integer IDs. For example, slices 202a can have a slice ID=1, slice 202b can have a slice ID=2, slice 202c can have a slice ID=3, and so on, where slice 202n can have a slice ID=N (e.g. the Nth integer for the Nth consecutive logical address slice). In at least one embodiment, the logical address slices can be assigned equally (or as equally as possible) among the nodes A and B in an alternating manner such that node A can be assigned as the exclusive owner of all slices having an odd slice ID and node B can be assigned as the exclusive owner of all slices have an even slice ID. In such an embodiment, all slices can be a same size where each volume or storage object can be partitioned into multiple slices.

In at least one embodiment, although write I/Os directed to a target LA can be received by both the node and non-owner node of the target LA, processing associated with the write I/O directed to a target LA can be performed by the node that owns the target LA. Such processing performed by the owner node in at least one embodiment can include recording the write I/O in a PDESC of the owner node's PDESC structure 812, and generating a corresponding GenSN for the recorded write I/O where the GenSN is stored in the PDESC for the write I/O. Such processing performed by the owner node in at least one embodiment can also include subsequent asynchronous processing of the write I/O such as flushing the recorded write I/O from the UD log. In at least one embodiment, the initiator node that receives the write I/O can return an acknowledgement to the host or external storage client that sent the write I/O. If the initiator node of the write I/O directed to the target LA is not the owner of the target LA, the initiator can issue an RPC to the owner node to handle or service the write I/O.

Consistent with other discussion herein, each node in the storage system maintaining its own node-local sequence number (SN). Each node-local SN of a single node can be included in a monotonically increasing sequence of numbers tracked, generated and maintained by the single node. Thus, in a dual node system, each of the two nodes can independently maintain and generate its own node-local monotonically increasing stream of SNs. In at least one embodiment where the storage system includes node A and node B, SN_A can denote the current SN generated by node A from node A's node-local sequence number stream SEQ_A; and SN_B can denote the current SN generated by node B from node B's node-local sequence number stream SEQ_B. In at least one embodiment, SEQ_A can be a monotonically increasing sequence of non-zero integers, where each next SN_A at time N+1 in SEQ_A is determined by adding 1 to SN_A of SEQ_A from time N. The foregoing can be formally represented as SN_A (N+1)=SN_A(N)+1, where SN_A(1) can be 1, and where SN_A(1) can denote the first or initial SN in SEQ_A. In at least one embodiment, SEQ_B can be a monotonically increasing sequence of non-zero integers, where each next SN_B at time N+1 in SEQ_B is determined by adding 1 to SN_B of SEQ_B from time N. The foregoing in at least one embodiment can be formally represented as SN_B(N+1)=SN_B(N)+1, where SN_B(1) can be 1, and where SN_B(1) can denote the first or initial SN in SEQ_B. In the foregoing, SN_A(N) can denote the Nth integer in the sequence SEQ_A, SN_A (N+1) can denote the N+1th integer in the sequence SEQ_A, SN_B(N) can denote the Nth integer in the sequence SEQ_B, and SN_B(N+1) can denote the N+1th integer in the sequence SEQ_B.

In at least one embodiment, each time N that a current SN_A is allocated or used from SEQ_A in connection with generating a Gen_SN including a non-zero corresponding value for node A, the next subsequent Gen_SN also including a non-zero corresponding value for node A can include the next consecutive SN_A+1 of SEQ_A. In this manner, each SN_A allocated from SEQ_A is the next sequence number in the sequence SEQ_A. Thus in at least one embodiment where SN_A can denote the next sequence number of SEQ_A to be allocated or used in connection with generating a next Gen_SN, once a current instance of SN_A is allocated or used in generating an instance of Gen_SN, then SN_A can be incremented or updated to the next sequential instance SN_A in the sequence SEQ_A. In this manner in at least one embodiment, SEQ_A denotes a monotonically increasing integer sequence where each element or integer in SEQ_A is used only once.

In at least one embodiment, each time N that a current SN_B is allocated or used from SEQ_B in connection with generating a Gen_SN including a non-zero corresponding value for node B, the next subsequent Gen_SN also including a non-zero corresponding value for node B can include the next consecutive SN_B+1 of SEQ_B. In this manner, each SN_B allocated from SEQ_B is the next sequence number in the sequence SEQ_B. Thus in at least one embodiment where SN_B can denote the next sequence number of SEQ_B to be allocated or used in connection with generating a next Gen_SN, once a current instance of SN_B is allocated or used in generating an instance of Gen_SN, then SN_B can be incremented or updated to the next sequential instance SN_B in the sequence SEQ_B. In this manner in at least one embodiment, SEQ_B denotes a monotonically increasing integer sequence where each element or integer in SEQ_B is used only once.

In at least one embodiment where the write I/O is handled as noted above by the owner node, where the owner node generates the GenSN, using only the owner node's local sequence number can provide correct relative ordering of recorded operations of the owner nodes PDESC structure 812, whereby global operation semantics and associated internode communication or RPC is not needed. In at least one embodiment, for operations that have global (e.g., cross-slice) meaning or more generally impact logical addresses owned by both nodes, a GenSN value is generated using a combination or concatenation of both SN_A and SN_B. The use of both SN_A and SN_B for an operation or command impacting logical addresses owned by both nodes A and B provides for correct ordering of the global operation relative to other recorded operations on each node separately. In at least one embodiment, generation of a GenSN for such global operations can be performed atomically and can include performing internode communication, such as by issuing an RPC over the internode link 120 of FIG. 2. In at least one embodiment, the supported global operations can include the create snapshot command to create a snapshot of a source storage object such as a volume, and can include the XCOPY command. In at least one embodiment, the create snapshot command creating a snapshot of a volume or other storage object can include acquiring an exclusive lock on the entire logical address range of the volume or storage object. In at least one embodiment, the XCOPY command to copy content from a source logical address LA1 to a target logical address LA2, can include acquiring a read lock on LA1 and a write lock on LA2. In at least one embodiment where any of the source LA1 and/or target LA2 of the XCOPY command includes multiple address locations with a first portion owned by node A and a second portion owned by node B, such locks acquired for all impacted first and second portions.

Referring to FIG. 9, shown is an example 900 illustrating the GenSN layout and corresponding field values that can vary in at least one embodiment in accordance with the techniques of the present disclosure.

In at least one embodiment, the values of the fields of the GenSN can be based, at least in part, on the node that owns the impacted one or more logical addresses of the recorded operation, command or request. In at least one embodiment, each PDESC can be assigned a unique GenSN generated in accordance with the techniques of the present disclosure as will now be described in connection with FIG. 9.

Each Gen_SN generated for a recorded command, operation or request of the UD log can have a layout including two fields as denoted by element 902. In particular, the GenSN 902 can include a field F1 corresponding to node A's serial number 902*a*; and a field F2 corresponding to node B's serial number 902*b*.

A generated GenSN for a recorded write I/O or a global operation can include fields F1 and F2 with various values based, at least in part, on whether the recorded operation is a write I/O or a global operation, and the one or more nodes that own logical addresses impacted by the recorded operation.

The elements 904, 906 and 908 illustrate the various cases or scenarios of values of Gen_SNs generated in accordance with the techniques of the present disclosure.

The element 904 denotes the case for a write I/O directed to a target LA owned by node A, where the field F1 is a non-zero value, the current SN_A in SEQ_A 904*a*; and where the field F2 is zero 904*b*.

The element 906 denotes the case for a write I/O directed to a target LA owned by node B, where the field F1 is zero 906*a*; and where the field F2 is a non-zero value, the current SN_B in SEQ_B 906*b*.

The element 908 denotes the case for a global operation, such as a create snapshot or XCOPY command, impacting LAs owned by both nodes A and B, where the field F1 is a non-zero value, the current SN_A in SEQ_A 908*a*; and where the field F2 is a non-zero value, the current SN_B in SEQ_B 908*b*.

In at least one embodiment generating unique Gen_SNs for corresponding recorded operations or commands of the UD log, a zero value in field F1 of a Gen_SN can denote that logical addresses owned by node A are not impacted, affected or used in connection with the corresponding command recorded in the UD log; a zero value in field F2 of a Gen_SN can denote that logical addresses owned by node B are not impacted, affected or used in connection with the corresponding command recorded in the UD log; a non-zero value in field F1 of a Gen_SN can denote that one or more logical addresses owned by node A are impacted, affected or used in connection with the corresponding command recorded in the UD log; and a non-zero value in field F2 of a Gen_SN can denote that one or more logical addresses owned by node B are impacted, affected or used in connection with the corresponding command recorded in the UD log.

Referring to FIG. 10, shown is a flowchart 1000 of processing steps that can be performed in at least one embodiment in accordance with the techniques of the present disclosure.

The steps of 1000 can be performed by an owner node of a target logical address, target LA, where the owner node receives a write I/O directed to the target LA.

At the step 1002, the owner node of the target LA is the initiator node that receives a write I/O storing content C1 to the target LA. The write I/O can be from an external host or other storage client. From the step 1002, control proceeds to the step 1004.

At the step 1004, the owner node allocates UD log resources for the write I/O. The owner node allocates a PDESC and a PB from the owner node's set of structures 812, 814 of the UD log in non-volatile memory. From the step 1004, control proceeds to the step 1006.

At the step 1006, the owner node persists the PB of the UD log, where the PB includes C1. From the step 1006, control proceeds to the step 1008.

At the step 1008, the owner node acquires one or more address locks for the entire target LA that can generally include one or more logical addresses. The address locks can be locks that are local to the initiator/owner node. The address locks can be exclusive or write locks providing the owner node with exclusive access to the target LA. From the step 1008, control proceeds to the step 1010.

At the step 1010, the owner node generates a unique Gen_SN locally for the write I/O. If the owner node is node A, the owner node generates the Gen_SN in accordance with the values of 904. If the owner node is node B, the owner node generates the Gen_SN in accordance with the values of 906. From the step 1010, control proceeds to the step 1012.

At the step 1012, the owner node persistently stores the PDESC for the write I/O of the UD log. The PDESC includes the Gen_SN (generated in step 1010). The PDESC also includes the target LA of the write I/O and a pointer to, address of, or reference to, the corresponding PB (persisted in step 1006) of the UD log. From the step 1012, control proceeds to the step 1014.

At the step 1014, the owner node updates volatile memory structures (e.g., cached copies) to include copies of the PDESC and PB of node-local volatile memory or cache. In at least one embodiment, completing of the step 1014, can make the results of the write I/O externally visible such as to an external host. In at least one embodiment, only the owning node can cache in the PDESC and PB in its volatile memory or cache. From the step 1014, control proceeds to the step 1016.

At the step 1016, the owner node releases the one or more locks (acquired in step 1008) for the target LA. From the step 1016, control proceeds to the step 1018.

At the step 1018, the owner node returns an acknowledgement regarding successful completion of the write I/O to the host or other storage client that sent the write I/O.

Referring to FIG. 12, shown is another flowchart 1100 of processing steps that can be performed in at least one embodiment in accordance with the techniques of the present disclosure.

The steps of 1100 can be performed by a non-owner node of a target logical address, target LA, where the non-owner node is an initiator node that receives a write I/O directed to the target LA.

At the step 1102, an initiator node receives a write I/O that stores content C1 to a target LA, where the peer node rather than the initiator node owns the target LA. The write I/O can be from an external host or other storage client. From the step 1102, control proceeds to the step 1104.

At the step 1104, the non-owner initiator node allocates a PB from the non-owner node's PB pool structure 814 of the UD log in non-volatile memory. From the step 1104, control proceeds to the step 1106.

At the step 1106, the non-owner node persists the PB of the UD log, where the PB includes C1. From the step 1106, control proceeds to the step 1108.

At the step 1108, the non-owner initiator node sends an RPC to the peer node that owns the target LA to further handle, or process the write I/O. In at least one embodiment, the RPC can be sent over the internode communication or link 120 as in FIG. 2. The RPC can include the address of, pointer to, or reference to the PB storing C1, where PB is included in the non-owner node's UD log resources (e.g., PB as allocated in the step 1104). More generally, the RPC request can include other relevant information regarding the write I/O such as the target LA.

In at least one embodiment, the step 1104 as noted above can be performed to have the non-owner initiator node store the written content C1 in a PB of the non-owner initiator node's set of PBs 814 and then send the pointer or address of the PB in the RPC request in the step 1108 as noted above. The foregoing can be performed in at least one embodiment as an alternative to sending the content C1 to the owner peer node in the RPC request such that the owner peer node can store the content C1 in a PB of the owner node's set of PBs 814. An embodiment can choose to perform steps 1104 and 1108 as noted rather then send C1 to the owner peer node in the RPC request in order to reduce the amount of data transmitted over the internode connection or link 120 (as in FIG. 2) used for internode communication. From the step 1108, control proceeds to the step 1110.

At the step 1110, the owner node receives the RPC request. In response to receiving the RPC request, the owner node performs processing of the steps 1110-1120 to further service, handle or process the write I/O request. In the step 1110, the owner node acquires one or more address locks for the entire target LA that can generally include one or more logical addresses. The address locks can be locks that are local to the initiator/owner node. The address locks can be exclusive or write locks providing the owner node with exclusive access to the target LA. From the step 1110, control proceeds to the step 1112.

At the step 1112, the owner node allocates a PDESC from the structure 812 of the owner node's UD log resources. From the step 1112, control proceeds to the step 1114.

At the step 1114, the owner node generates a unique Gen_SN locally for the write I/O. If the owner node is node A, the owner node generates the Gen_SN in accordance with the values of 904. If the owner node is node B, the owner node generates the Gen_SN in accordance with the values of 906. From the step 1114, control proceeds to the step 1116.

At the step 1116, the owner node persistently stores the PDESC for the write I/O of the UD log. The PDESC includes the Gen_SN (generated in step 1114). The PDESC also includes the target LA of the write I/O and a pointer to the corresponding PB (persisted in step 1106) in the peer non-owner's PB structures 814 of the UD log. From the step 1116, control proceeds to the step 1118.

At the step 1118, the owner node updates volatile memory structures (e.g., cached copies) to include copies of the PDESC and the PB of node-local volatile memory. In at least one embodiment, such updating the owner node's volatile memory structures can make the results of the write I/O externally visible such as to an external host. In at least one embodiment, only the owning node can cache in the PDESC and PB in its volatile memory or cache. From the step 1118, control proceeds to the step 1120.

At the step 1120, the owner node releases the one or more locks (acquired in step 1110) for the target LA; and then returns to the non-owner initiator node an acknowledgement or RPC reply regarding completion of the write I/O. In at least one embodiment, the RPC reply can be sent from owner node to the initiator non-owner node over the inter-node communication or link 120 as in FIG. 2. From the step 1120, control proceeds to the step 1122.

At the step 1122, the non-owner initiator node receives the RPC reply from the peer owner node; and then returns an acknowledgement regarding successful completion of the write I/O to the host or other storage client that sent the write I/O.

It should be noted that the foregoing processing of FIGS. 10 and 11 describe processing performed for write I/Os where the entire target LA or entire target LA range is owned by only a single one of the nodes A or B. In some cases, a write I/O received from a host or other storage client may be directed to target logical addresses with mixed ownership. In at least one embodiment, if a host write I/O received at the storage system is directed to target logical addresses with mixed ownership, including a first portion of LAs owned by node A and a second portion of LAs owned by node B, the write I/O can be partitioned by the receiving node into two write I/Os in accordance with the logical addresses owned by the respective nodes. For example assume the host write I/O is directed to multiple logical addresses LA1, LA2 and LA3 that cross a slice boundary where LA1 and LA2 are included in slice 1 owned by node A, and where LA3 is included in slice 2 owned by node B. In this case, the initiator node of the storage system receiving the single host write I/O can transparently (without knowledge of or expo-sure to the host) partition the single host write I/O into a first write I/O W1 that writes to LA1 and LA2, and a second write I/O W2 that writes to LA3. If the initiator node is node A, node A can perform local processing for W1, and can forward W2 to the peer node B for processing, where node B can return control back to node A once W2 is persistently recorded in the UD log. Alternatively, if the initiator node is node B, node B can perform local processing for W2, and can forward W1 to the peer node A for processing, where node A can return control back to node B once W1 is persistently recorded in the UD log. Thus generally in at least one embodiment as noted above where the target logical address range of a write I/O has mixed ownership, node A can locally process relevant owned first logical addresses of the target logical address range, and node B can locally process relevant owned second logical addresses of the target logical address range. Once both nodes A and B have handled or processed their respective owned logical addresses in connection with the write I/O, whichever one of the two nodes A and B is the initiator node that received the write I/O can then return a single acknowledgement to the host or other storage client regarding successful completion of the write I/O.

Referring to FIG. 12, shown is a flowchart 1200 of processing steps that can be performed in at least one embodiment in connection with servicing or handling a write I/O directed to a target address range having mixed ownership. The flowchart 1200 summarizes processing described above.

At the step 1202, an initiator node receives a write I/O from a host or other storage client. The write I/O writes to a mixed ownership target LA range, where the initiator node owns a first portion of the target LAs of the target LA range and the peer node owns the remaining second portion of target LAs of the target LA range. From the step 1202, control proceeds to the step 1204.

At the step 1204, the initiator node creates two write I/O, W1 and W2, from the single received host write I/O, where W1 writes to the first portion of target LAs owned by the initiator node, and where W2 writes to the second portion of target LAs owned by the peer node. From the step 1204, control proceeds to the step 1206.

At the step 1206, the initiator node processes W1 directed to the first portion of target LAs owned by the initiator node locally such as by performing processing as described in connection with FIG. 10 (e.g., steps 1002-1016). In at least one embodiment, W2 can be serviced, processed or handled by performing processing as described in FIG. 11 (e.g., steps 1102-1120). In connection with W2, the initiator node receives an RPC reply from the peer node that owns the second portion of target LAs once the peer node has com-pleted handling W2. In at least one embodiment, processing of W2 by the peer node can be performed in parallel while the initiator node handles processing of W1. As a variation, processing of W1 and W2 can be performed sequentially in any order. Once processing of both W1 and W2 have completed, the initiator node can return an acknowledge-ment regarding successful completion of the single host write I/O to the host or other storage client that sent the write I/O.

Referring to FIGS. 13A and 13B, shown is a flowchart 1300, 1301 of processing steps that can be performed in at least one embodiment in accordance with the techniques of the present disclosure in connection with recording a create snapshot command in the UD log. More generally in at least one embodiment, the processing of FIGS. 13A and 13B can be performed in connection with a global operation or command impacting logical addressed owned by both nodes A and B, where FIGS. 13A and 13B provide an illustrative example where the global operation or command is a create snapshot command. An embodiment can also perform other processing or logic related to the particular global command where such other processing or logic can vary with embodiment and command.

Additionally, it should be noted that FIGS. 13A and 13B describe processing where the create snapshot command, or more generally global operation or command, is received by node A as the initiator node. It is straightforward to further apply the processing of FIGS. 13A and 13B for use with a create snapshot or other global operation or command where the initiator node receiving the command is node B rather than node A. In this latter case, the steps of FIGS. 13A and 13B can be performed with respect to node B functioning as the initiator node rather than node A, and where the node A is the peer non-initiator node rather than node B.

At the step 1302, a create snapshot command can be received by node A. The create snapshot command can be a request to create a snapshot of a volume V1, or more generally, any suitable storage object. Logical addresses of V1 can be owned by both node A and node B. From the step 1302, control proceeds to the step 1304.

At the step 1304, the initiator node A can allocate a PDESC from node A's PDESC structure 812 of the UD log. From the step 1304, control proceeds to the step 1306.

At the step 1306, the initiator node A can acquire local locks on node A for the entire logical address range of V1 for which the snapshot is being created. The local locks can be write or exclusive locks. From the step 1306, control proceeds to the step 1308.

At the step 1308, the initiator node A generates its next SN_A from the node local sequence SEQ_A. From the step 1308, control proceeds to the step 1310.

At the step 1310, the initiator node A sends an RPC request to peer node B. The RPC request can be sent over the internode connection or link 120 of FIG. 2. The RPC request can include SN_A along with other information regarding the create snapshot command. The other information can, for example, identify the storage object such as volume V1 as well as the create snapshot command. From the step 1310, control proceeds to the step 1312.

At the step 1312, the peer node B can receive the RPC request and, in response, can commence processing. The peer node B can allocate a PDESC from node B's PDESC structure 812 of the UD log. From the step 1312, control proceeds to the step 1314.

At the step 1314, the peer node B can acquire local locks on node B for the entire logical address range of V1 for which the snapshot is being created. The local locks can be write or exclusive locks. From the step 1314, control proceeds to the step 1316.

At the step 1316, the peer node B generates its next SN_B from the node local sequence SEQ_B. From the step 1316, control proceeds to the step 1318.

At the step 1318, the peer node persists its PDESC (allocated in step 1312), where the PDESC includes a Gen_SN based on 908 of FIG. 9 that is a combination of SN_A (as sent in the RPC request received in step 1312) and SN_B (as generated in step 1316). The PDESC persisted by the peer node can also identify the create snapshot command and volume V1 for which the snapshot is taken. Thus the step 1318 can include the node B generating, in accordance with element 908 of FIG. 9, the GEN_SN for the recorded create snapshot command. From the step 1318, control proceeds to the step 1320.

At the step 1320, the peer node B updates its volatile memory structures (stored in volatile memory or cache local to node B) to include a PDESC corresponding to that as persisted in the step 1318 for the create snapshot command. Updating the volatile structures can make the results of the snapshot created externally visible such as to a host. From the step 1320, control proceeds to the step 1322.

At the step 1322, the peer node B releases the local locks (acquired in step 1314) for the entire logical address range of V1. From the step 1322, control proceeds to the step 1324.

At the step 1324, the peer node B returns an RPC reply to the node B acknowledging completion of the RPC request. The RPC reply can be sent over the internode communication connection or link 120 of FIG. 2. The RPC reply can include the SN_B of node B as generated in the step 1316 and used in the Gen_SN for the persisted PDESC of the create snapshot command (persisted in step 1318). From the step 1324, control proceeds to the step 1326.

At the step 1326, the node A receives the RPC reply and persists its own copy of the PDESC for the create snapshot operation. The PDESC persisted can be the allocated PDESC (allocated in step 1304) from node A's PDESC structure 1312. The persisted PDESC can include information corresponding to the create snapshot operation. Node A's persisted PDESC structure can include the same GEN_SN as the peer node's persisted PDESC (persisted in step 1318), and can also include information identifying the create snapshot command and volume for which the snapshot is taken. The GEN_SN can be based on element 908 of FIG. 9. Thus the step 1326 can include the node A generating, in accordance with element 908 of FIG. 9, the GEN_SN for the recorded create snapshot command. From the step 1326, control proceeds to the step 1328.

At the step 1328, the node A updates its volatile structures to include a PDESC corresponding to that as persisted in the step 1326 for the create snapshot command. Updating the volatile structures can make the results of the snapshot created externally visible such as to a host. From the step 1328, control proceeds to the step 1330.

At the step 1330, the node A can release its local locks (acquired in step 1306) on the entire logical address range of V1. From the step 1330, control proceeds to the step 1332.

At the step 1332, the node A can return an acknowledgement to the host or other storage client regarding completion of the create snapshot command.

As noted above, FIGS. 13A and 13B describe processing for a global command or operation impacting logical addresses owned by both nodes A and B, where the global command or operation is a create snapshot command or operation. More generally, processing of FIGS. 13A and 13B can be performed in connection with other supported global commands or operations, such as the XCOPY command or operation, to persistently record the global command or operation in the UD log along with a Gen_SN generated in accordance with element 908 of FIG. 9. In connection with other global commands such as the XCOPY command, the particular type of locks acquired can be read or shared locks and/or write or exclusive locks depending on the particular global operation. As noted above in connection with FIGS. 13A and 13B for the create snapshot command in at least one embodiment, all the locks acquired for relevant logical addresses of the volume or other object being snapshot can be exclusive or write locks. In at least one embodiment where the global operation is an XCOPY operation copying content from a source location to a target location, read or shared locks can be acquired for logical addresses of the source location, and write or exclusive locks can be acquired for logical addresses of the target location.

Consistent with other discussion herein, commands, operations or requests recorded in the UD log can be subsequently flushed from the UD log. In at least one embodiment, each of the nodes A and B can perform flushing of recorded operations from the UD log only for those recorded operations for which the node owns the logical addresses of the recorded operations. Put another way in at least one embodiment, node A can be responsible for flushing recorded operations of the UD log where such recorded operations impact logical addresses owned by node A; and node B can be responsible for flushing recorded operations of the UD log where such recorded operations impact logical addresses owned by node B. In connection with the forgoing in at least one embodiment, node A does not flush recorded operations of the UD log where such recorded operations impact logical addresses owned by node B (thus node A only flushes recorded UD log operations for logical addresses owned by node A). In at least one embodiment, node B does not flush recorded operations of the UD log where such recorded operations impact logical addresses owned by node A (thus node B only flushes recorded UD log operations for logical addresses owned by node B).

In at least one embodiment, flushing of recorded write I/Os from the UD log can be performed locally by the node that owns the target logical addresses written to by the recorded write I/Os. In such an embodiment where the write I/Os are recorded in PDESCs and PBs of corresponding owning nodes in accordance with the processing described herein (e.g., FIGS. 9, 10 and 11), the PDESCs include unique Gen_SNs generated in accordance with elements 904 and 906 of FIG. 9. In this manner, each node can flush recorded write I/Os of the UD log for target logical addresses owned exclusively by the node according to the node's locally generated sequence numbers. For example in at least one embodiment, for such write I/Os directed to target logical addresses owned by node A, node A recorded such write I/Os by performing processing locally on only node A where such write I/Os have corresponding PDESCs and corresponding unique Gen_SNs generated in accordance with element 904 of FIG. 9 including corresponding unique values for SN_A from SEQ_A. Thus node A can flush recorded write I/Os having corresponding PDESCs allocated from node A's UD log resources in accordance with the Gen_SN and in particular in accordance with the consecutive sequential ordering of SN_A values of the PDESCs. For example in at least one embodiment, node A can flush recorded write I/Os from its instance of the PDESC ring structure 812 where the PDESCs and the represented write I/Os can be flushed in an order corresponding to the increasing sequential ordering of the SN_A values in field F1 of the Gen_SN of the PDESCs. In at least one embodiment, for such write I/Os directed to target logical addresses owned by node A, node A recorded such write I/Os by performing processing locally on only node A where such write I/Os have corresponding PDESCs and corresponding unique Gen_SNs generated in accordance with element 906 of FIG. 9 including corresponding unique values for SN_B from SEQ_B. Thus node B can flush recorded write I/Os having corresponding PDESCs allocated from node B's UD log resources in accordance with the Gen_SN and in particular in accordance with the consecutive sequential ordering of SN_B values of the PDESCs. For example in at least one embodiment, node B can flush recorded write I/Os from its instance of the PDESC ring structure 812 where the PDESCs and the represented write I/Os can be flushed in an order corresponding to the increasing sequential ordering of the SN_B values in field F2 of the Gen_SN of the PDESCs.

In at least one embodiment, flushing of recorded global commands, such as create snapshot and XCOPY, from the UD log can be performed locally by both nodes, where each node is responsible for flushing portions of the logical address range of the global command owned exclusively by the particular node. For example, consider the create snapshot operation that creates a snapshot of volume V1 as discussed above where a first portion of V1's logical addresses are exclusively owned by node A, and where a second remaining portion of V1's logical addresses are exclusively owned by node B. In at least one embodiment as discussed above in connection with FIGS. 13A and 13B, node A can record a first PDESC in the UD log for the create snapshot command with respect to the first portion of logical addresses owned by node A, and node B can record a second PDESC in the UD log for the create snapshot command with respect to the second portion of logical addresses owned by node B. Subsequently in at least one embodiment, node A can flush the first PDESC for the first portion of logical addresses where the first PDESC is included in node A's set of UD log resources 812, 814; and node B can flush the second DESC for the second portion of logical addresses where the second PDESCs included in node B's set of UD log resources 812, 814.

Additionally, each of the nodes A and B when ordering commands of the UD log for flushing can use the Gen_SN values of the PDESCs to properly order the recorded commands of the UD log for flushing. In at least one embodiment, each node can flush PDESCs as recorded in its own instance of the PDESC ring structure written to exclusively by the node. In particular in at least one embodiment for the create snapshot command, node A can ensure that all relevant PDESCs having a Gen_SN with a first SN_A value in field F1 that is less than a second SN_A value in field F1 of a second Gen_SN of a PDESC corresponding to the create snapshot command are flushed from the UD log prior to the PDESC of the create snapshot command. In at least one embodiment with a create snapshot command, such relevant commands can include write I/Os directed to the same volume or storage object as the create snapshot command. For example, assume that the create snapshot command is recorded in PDESC 5 in node A's PDESC ring, where PDESC 5 includes a Gen_SN where SN_A=5 and where SN_B=6. In this case, node A can perform flushing of PDESCs recorded in its own PDESC ring structure 812 of the UD log based on increased sequential ordering of the SN_A values of the PDESCs 812 and ensure that all relevant PDESCs with Gen_SNs including an SN_A value in field F1 that is less than 5 are flushed before or prior to the PDESC 5 of the create snapshot command. To further illustrate, assume that node A recorded in its PDESC ring 812 4 (four) write I/Os directed to volume V1 prior to recording the create snapshot command in PDESC 5, where the 4 write I/Os are directed to target logical addresses of V1 owned exclusively by node A, and where the create snapshot command creates a snapshot of volume V1. The foregoing 4 write I/Os can be recorded by node A in PDESCs 1-4 of node A's PDESC ring 812, where the PDESCs 1-4 have corresponding Gen_SNs respectively including SN_A values 1-4. After the 4 write I/Os are recorded by node A, PDESC 5 can be recorded in node A's PDESC ring 812 with a Gen_SN including an SN_A value of 5 and an SN_B value of 6. When node A flushes PDESCs from its PDESC ring 812 as part of UD log flushing, node A can ensure that PDESCs 1-4 of its PDESC ring 812 are flushed prior to PDESC 5 corresponding to the create snapshot command for volume V1. Additionally, node A can ensure that PDESCs of its PDESC ring 812 having a Gen_SN greater than the SN_A value of 5 are flushed after PDESC 5 corresponding to the create snapshot command for volume V1.

Additionally, for the create snapshot command, node B can similarly ensure that all relevant PDESCs having a Gen_SN with a first SN_B value in field F2 that is less than a second SN_B value in field F2 of a second Gen_SN of a PDESC corresponding to the create snapshot command are flushed from the UD log prior to the PDESC of the create snapshot command. In at least one embodiment with a create snapshot command, such relevant commands can include write I/Os directed to the same volume or storage object as the create snapshot command. For example, assume that the create snapshot command is recorded in PDESC 6 that includes the same Gen_SN as noted above where SN_A=5 and where SN_B=6. In this case, node B can perform flushing of PDESCs recorded in its own PDESC ring structure 812 of the UD log based on increased sequential ordering of the SN_B values of the PDESCs 812 and ensure that all relevant PDESCs with Gen_SNs including an SN_B value in field F2 that is less than 6 are flushed before or prior to the PDESC 6 of the create snapshot command. To further illustrate, assume that node B recorded in its PDESC ring 812 5 (five) write I/Os directed to volume V1 prior to recording the create snapshot command in PDESC 6, where the 5 write I/Os are directed to target logical addresses of V1 owned exclusively by node B, and where the create snapshot command creates a snapshot of volume V1. The foregoing 5 write I/Os can be recorded by node B in PDESCs 1-5 of node B's PDESC ring 812, where the PDESCs 1-5 have corresponding Gen_SNs respectively including SN_A values 1-5. After the 5 write I/Os are recorded by node B, PDESC 6 can be recorded in node B's PDESC ring 812 with the Gen_SN including an SN_A value of 5 and an SN_B value of 6. When node B flushes PDESCs from its PDESC ring 812 as part of UD log flushing, node B can ensure that PDESCs 1-5 of its PDESC ring 812 are flushed prior to PDESC 6 corresponding to the create snapshot command for volume V1. Additionally, node B can ensure that PDESCs of its PDESC ring 812 having a Gen_SN greater than the SN_B value of 6 are flushed after PDESC 6 corresponding to the create snapshot command for volume V1.

Thus in at least one embodiment, each node can flush recorded commands or operations having corresponding PDESCs in the node's PDESC ring structure 812 in accordance with the values generated by the node's local sequence (e.g., SEQ_A for node A, and SEQ_B for node B). In at least one embodiment, node A can having multiple flusher threads or processes that flush first PDESCs of the node A's PDESC ring structure 812 based on increasing sequential ordering of SN_A values of field F1 of the first PDESCs; and node B can having multiple flusher threads or processes that flush second PDESCs of the node B's PDESC ring structure 812 based on increasing sequential ordering of SN_B values of field F2 of the second PDESCs. In at least one embodiment, each node can perform flushing independently from the other peer node in accordance with the node's local sequence numbers of Gen_SNs of PDESCs in the node's PDESC ring structure 812. Thus in such an embodiment, each node can also reclaim and reuse non-volatile (e.g., UD log resources) and volatile resources independently from the other peer node. For example, each node can reclaim and reuse PDESC and PB resources of the node's set of structures 812, 814 stored in non-volatile storage independently from the other peer node.

In at least one embodiment, when one of the nodes A and B fails, the remaining surviving node acquires temporary ownership of logical addresses owned by the failed node. The remaining surviving node also takes ownership of the failed node's set of resources or structures 812, 814 of the UD log. Subsequently when the failed node restarts, node fail back processing can be performed. Node fail back processing can include the failed node resuming ownership of its structures 812, 814. Node fail back processing can include the failed node resuming ownership of its logical addresses and resuming handling or processing of commands, including recording in the UD log commands directed to logical addresses owned by the node, including flushing recorded UD log commands with corresponding logical addresses owned by the node, and including forwarding to the peer node any received commands directed to logical address owned by the peer node.

In at least one embodiment, when one of the nodes fails, the surviving node takes ownership of the failed node's logical addresses and the failed node's set of resources or structures 812, 814 of the UD log as noted above. In at least one embodiment, the surviving node scans the PDESCs of the failed node's structure 812 to reconstruct instances of the failed node's structure 812, 814 in the surviving node's volatile memory or cache. In this manner in at least one embodiment, the surviving node (as the temporary owner of the failed node's logical addresses and structures 812, 814) now has the failed node's structures 812, 814 stored in its volatile memory or cache. During the PDESC scan of the failed node's structure 812 in at least one embodiment, the surviving node determines the highest, largest or last allocated sequence number SN_LAST for the failed node's local sequence. For example, if node B fails, node A scans the PDESCs of node B's structure 812 to determine SN_LAST, the highest, largest or last allocated SN_B from the failed node B's local sequence SEQ_B. Consistent with discussion below in at least one embodiment, the surviving node A can allocate any subsequently needed SN_B's from SEQ_B beginning with SN_LAST+1 while node B is down and while node A is assuming ownership of failed node B's logical addresses. During the PDESC scan of the failed node's structure 812, any I/Os directed to a logical address previously owned by the failed node can be temporarily paused and queued until the surviving node has completed necessary processing to takeover or assume ownership of the failed node's logical addresses. In at least one embodiment, such necessary processing can include performing the PDESC scan to determine the SN_LAST of the failed node and also can include storing the failed node's PDESCs and corresponding PBs in the surviving node's volatile memory or cache for use in further servicing subsequent I/Os. Once the surviving node A has completed such necessary processing, any queued or paused I/Os directed to logical addresses previously owned by the failed node B can be serviced by node A. While the failed node, such as failed node B, is down or offline, the surviving node, such as node A, can perform all processing for all write I/Os and other global commands since node A owns all logical addresses while node B is down.

In at least one embodiment, when the failed node such as node B is down, the surviving node such as node A can continue to maintain and manage persistent UD log resources of node A in a manner consistent with node A being up and running. Put another way, the surviving node A can maintain and manage the set of structures 812, 814 of node B as node B would in connection with handling writes and global commands directed to logical addresses that were previously owned by the failed node B. In a similar manner, the surviving node A can continue to allocate sequence numbers SN_B of SEQ_B of the failed node as needed in connection with forming Gen_SNs when handling commands or operations directed to logical addresses that were owned by the failed node B. For example, assume that failed node B previously owned logical address LA1 which the surviving node A temporarily assumes ownership of (while node B is down or offline). During the time that node B is down, node A receives a write I/O W11 directed to LA1. In response, node A continues to allocate, manage and maintain SN_Bs, Gen_SNs and node B's set of structures 812, 814 as the failed node B would have. For example in connection with W11, W11 directed to LA1 can be received by node A while node B is down. In response, node A can perform processing such as described in connection with FIG. 10 to service W11 using the failed node B's resources (e.g., SEQ_B, node B's set of structures 812, 814) including: a) allocating a PDESC from failed node B's PDESC structure 812; b) allocating a PB from failed node B's PB structure 814; c) generating a next SN_B from node B's local sequence SEQ_B, and generating a unique Gen_SN (Gen_SN 11) in accordance with 906 for W11 by storing the next SN_B in field F2 of the Gen_SN and by storing 0 in the field F1 of the Gen_SN; d) persisting the PDESC in node B's structure 812 where the PDESC includes the unique Gen_SN 11; and e) persisting the PB in node B's structure 814 where the PB includes the content written by W11. Thus for commands received by node A while node B is down where the commands are directed to logical addresses previously owned by the failed node B, the surviving node A continues to generate SN_Bs and Gen_SNs, continues to allocate PDESCs from node B's structure 812, and continues to allocate PBs from node B's structure 814 as would otherwise be performed by the failed node B. Put another way in at least one embodiment, node A acts as a proxy for the failed node B with respect to write I/Os and global commands (e.g., XCOPY and create snapshot command) for logical addresses previously owned by the failed node B. As a proxy the surviving node A services the commands or operations directed to logical addresses previously owned by the failed node B and also manages and maintains the failed node B's UD log resources and SEQ_B for such operations. In this manner, UD log resources of persistent non-volatile memory can be managed and maintained in a same manner as would otherwise be managed and maintained if both nodes A and B were handling their respective owned logical addresses.

Subsequently the failed node B can be restarted and node failback processing can be performed so that node B can resume processing of write I/Os and global commands directed to logical addresses previously owned by node B. The node failback processing can include node B resuming ownership of the logical addresses previously owned by the node B as prior to the failure of node B. The node failback processing can include the node A sending to node B SN_LAST2, the last, highest or greatest SN_B from the SEQ_B that node A allocated while node A acted as node B's proxy (e.g., while node B was down or offline). Node B can then resume allocating or generating any next SN_B from SEQ_B at the next sequence number of SEQ_B following SN_LAST2. For example in at least one embodiment where SEQ_B denotes a sequence of consecutive integer values incremented by 1 and beginning with 1, the next SN_B generated by node B can be SN_LAST2+1. In at least one embodiment during node failback processing, any commands or operations directed to logical addresses for which node B is resuming ownership can be quiesced or paused. For example in at least one embodiment, write I/Os and global commands directed to logical addresses for which node B is resuming ownership can be queued during the node failback processing. Subsequent to completing node failback processing where node B is up and running and able to service commands, any queued commands directed to logical addresses owned by node B can now be serviced or handled.

In at least one embodiment, communications between the nodes A and B can be performed by sending messages and subsequent replies or responses over the internode communication connection or link 120 of FIG. 2.

Referring to FIG. 14, shown is a flowchart 1400 of processing that can be performed in at least one embodiment in accordance with the techniques of the present disclosure. The flowchart 1400 summarizes processing described above in connection with failover and failback processing in at least one embodiment. The flowchart 1400 is described with respect to the failing node being node B and the surviving node being node A for purposes of illustration. It is straightforward to apply the processing of FIG. 14 in connection with scenario where node A is the failing node and node B is the surviving node.

At the step 1402, node B fails and failover processing is performed for node A to take ownership of the logical addresses owned by node B, and for node A to take over management and maintaining the failed node B's set of UD log structure 812, 814. Failover processing can include node A scanning node B's structure 812 of PDESCs to determine SN_LAST, the last or largest SN_B allocated from SEQ_B. Failover processing can include node A storing in its node-local volatile memory or cache instances of node B's structures 812, 814. During failover processing, commands received at the node A that are directed to a logical address owned by node B prior to failure can be temporarily paused and queued on node A. From the step 1402, control proceeds to the step 1404.

At the step 1404, after failover processing is complete, any such temporarily paused and queued commands (that are directed to logical addresses previously owned by the failed node B) can be serviced by node A where node A acts as a proxy for the failed node B with respect to node B's UD log resources 812, 814 and with respect to generating Gen_SNs using SN_Bs of SEQ_B. As a proxy, node A can manage and maintain node B's UD log resources 812, 814 and can generate Gen_SNs as would be performed by node B if node B were up and running and servicing the write I/O or other command. From the step 1404, control proceeds to the step 1406.

At the step 1406, after failover processing is complete, node A receives write I/Os or other commands directed to logical addresses LA1 previously owned by node B. For each of the received write I/Os or other commands directed to an LA1 previously owned by node B, node A acts as a proxy for node B with respect to node B's UD log resources 812, 814 and with respect to generating Gen_SNs using SN_Bs of SEQ_B. As a proxy, node A can manage and maintain node B's UD log resources 812, 814 and can generate SN_Bs and Gen_SNs as would be performed by node B if node B were up and running and servicing the write I/Os or other commands. From the step 1406, control proceeds to the step 1408.

At the step 1408, the failed node B restarts and node failback processing is performed. Node failback processing can include moving ownership of node B's previously owned logical addresses back to node B, and includes node B resuming management and maintenance of node B's UD log structures 812, 814. Node failback processing can include node A sending SNLAST 2 to node B over the internode communication link, where SNLAST2 is the last or highest SN_B from SEQ_B allocated by node A while node A acted as a proxy for the failed node B. During node failback processing, writes or other commands directed to logical addresses previously owned by node B or being moved to node B can be paused and queued. After failback processing is complete, any queued writes or other commands directed to logical addresses now owned by node B can be serviced or handled by node B as described in connection with FIGS. 10, 11, 12, 13A and 13B. Also after failback processing is complete for any subsequently received writes or other commands, normal command processing can resume as described in connection with FIGS. 10, 11, 12, 13A and 13B. After failback processing is complete, node B can resume handling writes or other commands directed to logical addresses owned by node B using SN_LAST2+1 denoting the next SN_B in SEQ_B available for allocation.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a first command at a first node in a system, wherein the system further includes a second node, wherein the first node manages a first set of user data (UD) log resources including a first structure of page descriptors (PDESCs) and second structure of page blocks (PBs), wherein the second node manages a second set of UD log resources including a third structure of PDESCs and a fourth structure of PBs, wherein the first node generates sequence numbers from a first node-local sequence SEQ1 of monotonically increasing integer values greater than zero, where the second node generates sequence number from a second node-local sequence SEQ2 of monotonically increasing integer values greater than zero, wherein a UD log includes the first set of UD log resources and the second set of UD log resources, wherein each command, operation or request recorded in the UD log is associated with a unique corresponding generic serial number (GENSN) that includes a first field F1 with a value corresponding to the first node for the recorded command, operation or request, and that includes a second field F2 with a value corresponding to the second node for the recorded command, operation or request;
determining whether the first command is a first write I/O directed to first one or more logical addresses owned exclusively by the first node that received the first command; and responsive to determining the first command is a first write I/O directed to first one or more logical addresses owned exclusively by the first node, performing first processing by the first node to record the first write I/O in the UD log without any internode communication with the second node, the first processing performed by the first node including:
generating a first GENSN uniquely identifying the first write I/O, wherein the first GENSN includes a first sequence number SN1 allocated from SEQ1 in F1 and includes a zero value in F2; and
recording the first write I/O in the UD log including:
storing a first PDESC of the first structure of PDESCs of the first set of UD log resources managed by the first node, wherein the first PDSEC describes the first write I/O, wherein the first PDESC includes the first GENSN uniquely identifying the first write I/O recorded in the UD log.

2. The computer-implemented method of claim 1, wherein the first processing performed by the first node includes:
storing first content C1 written by the first write I/O in a first PB of the second structure of PBs of the first set of UD log resources managed by the first node, wherein the first PDESC includes a pointer to, reference to, or address of the first PB; and
storing copies of the first PB and the first PDESC in volatile memory of the first node.

3. The computer-implemented method of claim 2, wherein the first processing includes:
prior to said storing the first PDESC and prior to said storing copies of the first PB and the first PDESC, acquiring one or more exclusive locks providing the first node exclusive access to the first one or more logical addresses of the first write I/O;
releasing the one or more exclusive locks of the first one or more logical addresses after performing said storing the first PDESC and after performing said storing copies of the first PB and the first PDESC; and
after said releasing the one more exclusive locks, the first node returning an acknowledgement to a client that sent the first write I/O to the system.

4. The computer-implemented method of claim 1, further comprising:
determining whether the first command is a second write I/O directed to second one or more logical addresses owned exclusively by the second node that did not receive the first command; and
responsive to determining the first command is a second write I/O directed to second one or more logical addresses owned exclusively by the second node that did not receive the first command, performing second processing including:
the second node generating a second GENSN uniquely identifying the second write I/O, wherein the second GENSN includes a zero value in F1 and includes a second sequence number SN2 allocated from SEQ2 in F2; and
recording the second write I/O in the UD log including:
storing, by the second node, a second PDESC of the third structure of PDESCs of the second set of UD log resources managed by the second node, wherein the second PDSEC describes the second write I/O, and wherein the second GENSN is included in the second PDESC.

5. The computer-implemented method of claim 4, wherein the second processing includes:

storing, by the first node that received the second write I/O, first content C1 written by the second write I/O in a first PB of the second structure of PBs of the first set of UD log resources managed by the first node;

the first node sending a remote procedure call (RPC) to the second node, wherein the RPC includes a pointer to, address of, or reference to the first PB; and responsive to the second node receiving the RPC from the first node, the second node performing third processing, wherein the third processing includes:

the second node acquiring one or more exclusive locks on the second one or more logical addresses of the second write I/O;

after the second node acquires the one or more exclusive locks, the second node performing said storing the second PDESC;

after the second node performs said storing the second PDESC, the second node storing copies of the first PB and the second PDESC in volatile memory of the second node;

after the second node performs said storing the second PDESC and said storing the copies of the first PB and the second PDESC, the second node releasing the one or more exclusive locks of the second one or more logical addresses of the second write I/O; and after the second node releases the one or more exclusive locks, the second node sending an RPC reply to the first node.

6. The computer-implemented method of claim 5, further comprising;

responsive to the first node receiving the RPC reply, the first node sending an acknowledgement to a storage client that sent the second write I/O to the system.

7. The computer-implemented method of claim 1, further comprising:

determining whether the first command is a global command directed to a first set of one or more logical addresses owned by the first node and a second set of one or more logical addresses owned by the second node; and responsive to determining the first command is the global command directed to the first set of one or more logical addresses owned by the first node and the second set of one or more logical addresses owned by the second node, performing second processing including:

the first node allocating a third sequence number SN3 from SEQ1;

the first node acquiring first local locks of the first node for the first set of one or more logical addresses and the second set of one or more logical addresses;

the first node sending an RPC to the second node, wherein the RPC includes SN3; and responsive to the second node receiving the RPC, the second node performing third processing including:

the second node acquiring second local locks of the second node for the first set of one or more logical addresses and the second set of one or more logical addresses;

the second node allocating a fourth sequence number SN4 from SEQ2;

the second node storing a second PDESC of the third structure of PDESCs of the second set of UD log resources managed by the second node, wherein the second PDESC describes the global command, wherein the second PDESC includes a second GENSN uniquely identifying the global command, and wherein the second GENSN includes SN3 in F1 and includes SN4 in F2;

the second node storing a copy of the second PDESC in volatile memory of the second node;

the second node releasing the second local locks of the second node; and the second node returning an RPC reply to the first node.

8. The computer-implemented method of claim 7, wherein the second processing includes:

responsive to the first node receiving the RPC reply from the second node, the first node performing fourth processing including:

storing a third PDESC of the first structure of PDESCs of the first set of UD log resources managed by the first node;

storing a copy of the third PDESC in volatile memory of the first node;

releasing the first local locks of the first node; and sending an acknowledgement to a client that sent the global command to the system.

9. The computer-implemented method of claim 8, wherein the global command is a create snapshot command that creates a snapshot of a storage object including the first one or more logical addresses and including the second one or more logical addresses.

10. The computer-implemented method of claim 9, wherein the first one or more logical addresses and the second one or more logical addresses collectively form an entire logical address range of the storage object for which the snapshot is created.

11. The computer-implemented method of claim 10, wherein the storage object is any of: a volume, a logical device, a file, a directory, and a file system.

12. The computer-implemented method of claim 11, wherein the first local locks and the second local locks are exclusive or write locks.

13. The computer-implemented method of claim 8, wherein the global command is an extended copy (XCOPY) command that performs an internal copy operation within the system from a source location to a target location, wherein said acquiring the first local locks and said acquiring the second local locks includes:

acquiring one or more read or shared locks for logical addresses corresponding to the source location; and acquiring one or more write or exclusive locks for logical addresses corresponding to the target location.

14. The computer-implemented method of claim 1, wherein the first set of UD log resources and the second set of UD log resources are structures in non-volatile memory used for persistently recording commands, requests and operations in the UD log.

15. The computer-implemented method of claim 1, wherein the first command is received from a host or other storage client that is external with respect to the system.

16. The computer-implemented method of claim 1, further comprising:

assigning exclusive ownership of a plurality of logical addresses including the first one or more logical addresses among the first node and the second node.

17. The computer implemented method of claim 16, wherein each of the first node and the second node only flush recorded commands, operations or requests of the UD log for logical addresses owned by exclusively by said each node, and wherein method includes:

the first node flushing a first plurality of PDESCs of the first structure of PDESCs of the first set of UD log resources managed by the first node in accordance with increased ordering of values of F1 of the first plurality of PDESCs; and the second node flushing a second plurality of PDESCs of the third structure of PDESCs of the second set of UD log resources managed by the second node in accordance with increased ordering of values of F2 of the second plurality of PDESCs.

18. The computer-implemented method of claim 1, further comprising:

the first node failing;

responsive to the first node failing, performing node failover processing, wherein the node failover processing includes the second node taking ownership of all logical addresses owned by the first node, and the second node taking over management of the first set of UD log resources while the first node is down or unavailable, wherein the node failover processing includes the second node scanning PDESCs of the first structure to determine SN_LAST, a largest or last sequence number of SEQ1 allocated by the first node prior to the first node failing;

after performing node failover processing and while the first node is down or unavailable, the second node acting as a proxy for the first node such that the second node manages the first set of UD resources and allocates sequence numbers from SEQ1 subsequent to SN_LAST as needed to process received commands, operations or requests recorded in the UD log, wherein SN_LAST2 denotes the last or largest sequence number of SEQ1 allocated by the second node when acting as a proxy for the first node while the first node is down or unavailable; and restarting the first node and performing node failback processing, wherein the node failback processing includes the first node reacquiring ownership of all logical addresses previously owned by the first node prior to the node failover processing, wherein after completing the node failback processing, the first node resumes allocating sequence numbers from SEQ1 commencing with a consecutive next sequence number of SEQ1 subsequent to SN_LAST2.

19. A system comprising:

one or more processors; and a memory comprising code stored thereon that, when executed, performs a method comprising:

receiving a first command at a first node in a system, wherein the system further includes a second node, wherein the first node manages a first set of user data (UD) log resources including a first structure of page descriptors (PDESCs) and second structure of page blocks (PBs), wherein the second node manages a second set of UD log resources including a third structure of PDESCs and a fourth structure of PBs, wherein the first node generates sequence numbers from a first node-local sequence SEQ1 of monotonically increasing integer values greater than zero, where the second node generates sequence number from a second node-local sequence SEQ2 of monotonically increasing integer values greater than zero, wherein a UD log includes the first set of UD log resources and the second set of UD log resources, wherein each command, operation or request recorded in the UD log is associated with a unique corresponding generic serial number (GENSN) that includes a first field F1 with a value corresponding to the first node for the recorded command, operation or request, and that includes a second field F2 with a value corresponding to the second node for the recorded command, operation or request;

determining whether the first command is a first write I/O directed to first one or more logical addresses owned exclusively by the first node that received the first command; and responsive to determining the first command is a first write I/O directed to first one or more logical addresses owned exclusively by the first node, performing first processing by the first node to record the first write I/O in the UD log without any internode communication with the second node, the first processing performed by the first node including:

generating a first GENSN uniquely identifying the first write I/O, wherein the first GENSN includes a first sequence number SN1 allocated from SEQ1 in F1 and includes a zero value in F2; and recording the first write I/O in the UD log including:

storing a first PDESC of the first structure of PDESCs of the first set of UD log resources managed by the first node, wherein the first PDSEC describes the first write I/O, wherein the first PDESC includes the first GENSN uniquely identifying the first write I/O recorded in the UD log.

20. A non-transitory computer readable medium comprising code stored thereon that, when executed, performs a method comprising:

receiving a first command at a first node in a system, wherein the system further includes a second node, wherein the first node manages a first set of user data (UD) log resources including a first structure of page descriptors (PDESCs) and second structure of page blocks (PBs), wherein the second node manages a second set of UD log resources including a third structure of PDESCs and a fourth structure of PBs, wherein the first node generates sequence numbers from a first node-local sequence SEQ1 of monotonically increasing integer values greater than zero, where the second node generates sequence number from a second node-local sequence SEQ2 of monotonically increasing integer values greater than zero, wherein a UD log includes the first set of UD log resources and the second set of UD log resources, wherein each command, operation or request recorded in the UD log is associated with a unique corresponding generic serial number (GENSN) that includes a first field F1 with a value corresponding to the first node for the recorded command, operation or request, and that includes a second field F2 with a value corresponding to the second node for the recorded command, operation or request;

determining whether the first command is a first write I/O directed to first one or more logical addresses owned exclusively by the first node that received the first command; and responsive to determining the first command is a first write I/O directed to first one or more logical addresses owned exclusively by the first node, performing first processing by the first node to record the first write I/O in the UD log without any internode communication with the second node, the first processing performed by the first node including:

generating a first GENSN uniquely identifying the first write I/O, wherein the first GENSN includes a first sequence number SN1 allocated from SEQ1 in F1 and includes a zero value in F2; and recording the first write I/O in the UD log including:
    storing a first PDESC of the first structure of PDESCs of the first set of UD log resources managed by the first node, wherein the first PDSEC describes the first write I/O, wherein the first PDESC includes the first GENSN uniquely identifying the first write I/O recorded in the UD log.

\* \* \* \* \*